(12) United States Patent
Lee et al.

(10) Patent No.: US 12,199,771 B2
(45) Date of Patent: Jan. 14, 2025

(54) METHOD AND DEVICE FOR DETERMINING RESOURCE SELECTION WINDOW ON BASIS OF INFORMATION RELATED TO SIDELINK HARQ FEEDBACK IN WIRELESS COMMUNICATION SYSTEM

(71) Applicant: LG Electronics Inc., Seoul (KR)

(72) Inventors: Jongyoul Lee, Seoul (KR); Hanbyul Seo, Seoul (KR); Seungmin Lee, Seoul (KR); Sunghoon Jung, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 688 days.

(21) Appl. No.: 17/222,620

(22) Filed: Apr. 5, 2021

(65) Prior Publication Data

US 2021/0226735 A1 Jul. 22, 2021

Related U.S. Application Data

(63) Continuation of application No. 16/891,595, filed on Jun. 3, 2020, now Pat. No. 10,992,424, which is a continuation of application No. PCT/KR2019/014181, filed on Oct. 25, 2019.

(60) Provisional application No. 62/771,555, filed on Nov. 26, 2018, provisional application No. 62/750,306, filed on Oct. 25, 2018.

(51) Int. Cl.
*H04L 1/1812* (2023.01)
*H04W 72/52* (2023.01)

(52) U.S. Cl.
CPC .......... *H04L 1/1812* (2013.01); *H04W 72/52* (2023.01)

(58) Field of Classification Search
CPC ..... H04L 1/1812; H04L 5/0005; H04L 5/001; H04L 1/1861; H04L 1/1887; H04L 1/1893; H04L 5/0053; H04L 5/0055; H04L 5/0057; H04L 5/0064; H04W 72/52; H04W 92/18; H04W 28/04; H04W 72/02; H04W 72/51;
(Continued)

(56) References Cited

U.S. PATENT DOCUMENTS 9,137,790 B2 * 9/2015 Chiu ..................... H04L 1/1896
10,334,586 B2 * 6/2019 Gulati .................. H04L 1/1896
(Continued)

FOREIGN PATENT DOCUMENTS

WO   WO2017/209005   7/2017
WO   WO2017140475   8/2017
(Continued)

OTHER PUBLICATIONS

JP Office Action in Japanese Appln. No. 2020-531694, dated Apr. 20, 2021, 7 pages (with English translation).
(Continued)

*Primary Examiner* — Charles N Appiah
*Assistant Examiner* — Frank E Donado
(74) *Attorney, Agent, or Firm* — Fish & Richardson P.C.

(57) ABSTRACT

According to an embodiment, proposed herein is an operating method of a first apparatus in a wireless communication system. The method may include the steps of determining a first region for selecting resources related to transmission of sidelink information, and adjusting the first region to a second region based on information related to sidelink HARQ feedback.

20 Claims, 30 Drawing Sheets

(58) Field of Classification Search
CPC ..... H04W 72/53; H04W 72/25; H04W 72/40; H04W 76/14
USPC .......................................................... 370/329
See application file for complete search history.

(56) References Cited

U.S. PATENT DOCUMENTS

| | | | |
|---|---|---|---|
| 10,375,681 B2 | 8/2019 | Papasakellariou | |
| 10,701,714 B2 | 6/2020 | Shin et al. | |
| 2009/0181689 A1* | 7/2009 | Lee | H04L 5/0055 455/450 |
| 2011/0105167 A1* | 5/2011 | Pan | H04L 5/0023 455/507 |
| 2011/0176443 A1 | 7/2011 | Astely et al. | |
| 2011/0179329 A1* | 7/2011 | Kim | H04L 1/1825 714/E11.01 |
| 2012/0087254 A1 | 4/2012 | Yin et al. | |
| 2013/0091229 A1* | 4/2013 | Dunn | G06Q 50/01 709/206 |
| 2016/0128082 A1 | 5/2016 | Chen et al. | |
| 2016/0182187 A1 | 6/2016 | Kim et al. | |
| 2016/0219620 A1* | 7/2016 | Lee | H04W 76/14 |
| 2016/0248550 A1* | 8/2016 | Sorrentino | H04L 1/08 |
| 2016/0261391 A1 | 9/2016 | Chen et al. | |
| 2017/0064733 A1 | 3/2017 | Lee et al. | |
| 2017/0215183 A1 | 7/2017 | Gulati et al. | |
| 2017/0359749 A1* | 12/2017 | Dao | H04L 47/2416 |
| 2018/0006791 A1 | 1/2018 | Marinier et al. | |
| 2018/0102915 A1 | 4/2018 | Rico Alvarino et al. | |
| 2018/0146398 A1* | 5/2018 | Kim | H04W 80/02 |
| 2018/0152986 A1 | 5/2018 | Jung et al. | |
| 2018/0263062 A1 | 9/2018 | Lee et al. | |
| 2019/0044667 A1 | 2/2019 | Guo et al. | |
| 2019/0052436 A1 | 2/2019 | Desai et al. | |
| 2019/0053253 A1 | 2/2019 | Jung et al. | |
| 2019/0058986 A1* | 2/2019 | Loehr | H04L 1/1825 |
| 2019/0059015 A1 | 2/2019 | Lee et al. | |
| 2019/0124673 A1 | 4/2019 | Seo et al. | |
| 2019/0239039 A1 | 8/2019 | Hahn | |
| 2020/0029245 A1* | 1/2020 | Khoryaev | H04W 36/22 |
| 2020/0329484 A1 | 10/2020 | Lee et al. | |
| 2021/0307023 A1* | 9/2021 | He | H04W 72/02 |

FOREIGN PATENT DOCUMENTS

| | | |
|---|---|---|
| WO | WO2017176098 | 10/2017 |
| WO | WO2018062857 | 4/2018 |

OTHER PUBLICATIONS

Caict, "Considerations on Resource Allocation of NR V2X Sidelink," R1-1809287, 3GPP TSG RAN WG1 Meeting #94, Gothenburg, Sweden, Aug. 20-24, 2018, 6 pages.

Ericsson, "On Mode 2 Resource Allocation for NR Sidelink," R1-1811594, 3GPP TSG-RAN WG1 Meeting #94-Bis, Chengdu, China, dated Oct. 8-12, 2018, 12 pages.

Extended European Search Report in EP Appln. No. 19875922.7, dated Feb. 8, 2021, 13 pages.

Intel Corporation, "Sidelink Resource Allocation Mechanisms for NR V2X Communication," R1-1808696, 3GPP TSG RAN WG1 Meeting #94, Gothenburg, Sweden, dated Aug. 20-24, 2018, 15 pages.

Intel Corporation, "UE-Autonomous Resource Allocation for NR V2X Sidelink Communication," R1-1908635, 3GPP TSG RAN WG1 Meeting #98, Prague, Czech Republic, Aug. 26-30, 2019, 28 pages.

InterDigital Inc., "QoS Management for NR V2X," R2-1814018, 3GPP RAN WG2 Meeting #103bis, Chengdu, China, Oct. 8-12, 2018, 5 pages.

InterDigital Inc., "Resource Allocation for NR V2X," R1-1811115, 3GPP RAN WG1 Meeting #94b, Chengdu, China, dated Oct. 8-12, 2018, 7 pages.

ITL, "Discussion on NR V2X HARQ mechanism," R1-1811615, 3GPP TSG-RAN WG1 Meeting #94bis, Chengdu, China, dated Oct. 8-12, 2018, 6 pages.

Korean Office Action in Korean Appln. No. 10-2020-7015290, dated Jul. 17, 2020, 13 pages (with English translation).

KR Notice of Allowance in Korean Appln. No. 10-2020-7015290, dated Nov. 27, 2020, 15 pages (with English translation).

LG Electronics, "Discussion on maximum time reduction between packet arrival and selected transmission resource," R1-1804515, 3GPP TSG RAN WG1 Meeting #92bis, Sanya, China, dated Apr. 16-20, 2018, 3 pages.

MCC Support, "Draft Report of 3GPP TSG RAN WG1 #94bis v0.1.0(Chengdu, China, Oct. 8-12, 2018)," 3GPP TSG RAN WG1 Meeting #95, R1-181xxxx, Spokane, USA, Nov. 12-16, 2018, 4 pages.

Office Action in Chinese Appln. No. 201980006758.7, mailed on Oct. 29, 2023, 12 pages (with English translation).

* cited by examiner

METHOD AND DEVICE FOR DETERMINING RESOURCE SELECTION WINDOW ON BASIS OF INFORMATION RELATED TO SIDELINK HARQ FEEDBACK IN WIRELESS COMMUNICATION SYSTEM

CROSS-REFERENCE TO RELATED APPLICATIONS

This application is a continuation of U.S. application Ser. No. 16/891,595, filed on Jun. 3, 2020, which is a continuation pursuant to 35 U.S.C. § 119(e) of International Application PCT/KR2019/014181, with an international filing date of Oct. 25, 2019, which claims the benefit of U.S. Provisional Patent Application Nos. 62/750,306 filed on Oct. 25, 2018, and 62/771,555 filed on Nov. 26, 2018, the contents of which are hereby incorporated by reference herein in their entirety.

BACKGROUND OF THE DISCLOSURE

Field of the Disclosure

This disclosure relates to a wireless communication system.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on, via wired/wireless communication. The V2X may be divided into 4 types, such as vehicle-to-vehicle (V2V), vehicle-to-infrastructure (V21), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, in sidelink communication, a user equipment (UE) may configure a resource selection window (SW). For example, a UE may sort selectable resources through a sensing process and may select a resource from the configured resource selection window. For example, the UE may select a resource selection window for an initial transmission based on latency requirements of an application and processing timing of the UE. Herein, in case HARQ feedback is being supported, it may be difficult for the UE to satisfy the latency requirements due to the transmission timing of the HARQ feedback.

Technical Solutions

According to an embodiment, proposed herein is an operating method of a first apparatus (100) in a wireless communication system. The method may include the steps of determining a first region for selecting resources related to transmission of sidelink information, and adjusting the first region to a second region based on information related to sidelink HARQ feedback.

Effects of the Disclosure

A user equipment (UE) may efficiently perform sidelink communication.

BRIEF DESCRIPTION OF THE DRAWINGS

FIG. 27 shows a vehicle, in accordance with an embodiment of the present disclosure. The vehicle may be implemented as a transport means, an aerial vehicle, a ship, and so on.

DESCRIPTION OF EXEMPLARY EMBODIMENTS

In various embodiments of the present disclosure, it shall be interpreted that "I" and "," indicate "and/or". For example, "A/B" may mean "A and/or B". Additionally, "A, B" may also mean "A and/or B". Moreover, "AB/C" may mean "at least any one of A, B and/or C". Furthermore, "A, B, C" may also mean "at least any one of A, B and/or C".

In various embodiments of the present disclosure, it shall be interpreted that "or" indicates "and/or". For example, "A or B" may include "only A", "only B", and/or "both A and B". In other words, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 1:
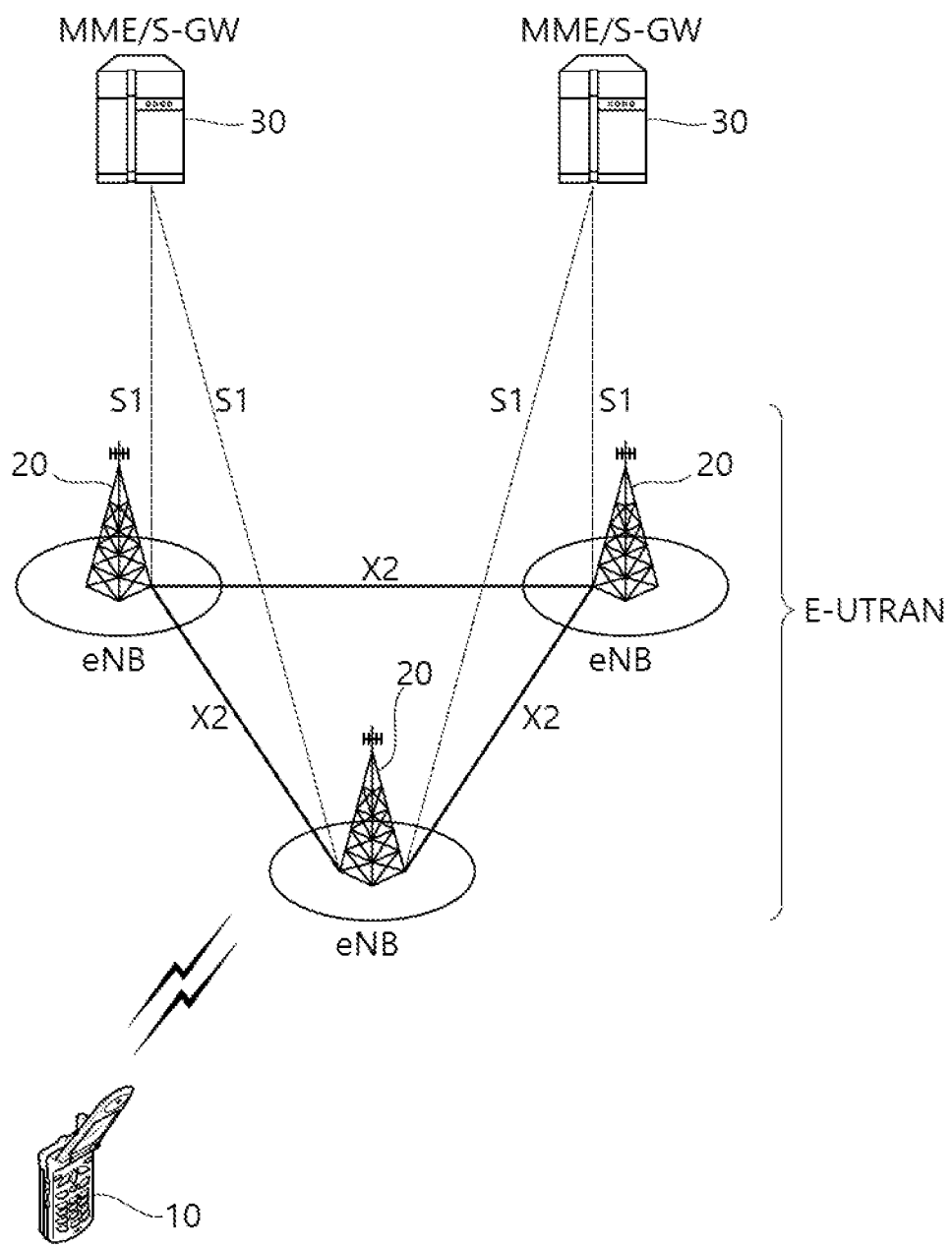
FIG. 1 shows a structure of an LTE system, in accordance with an embodiment of the present disclosure.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
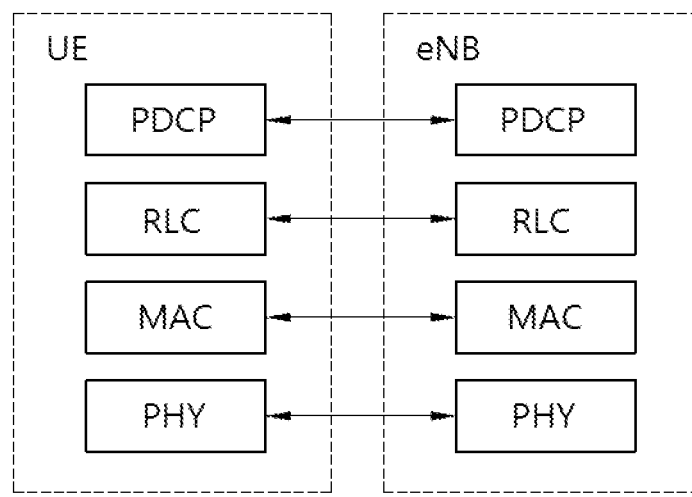
FIG. 2 shows a radio protocol architecture of a user plane, in accordance with an embodiment of the present disclosure.
Figure 3:
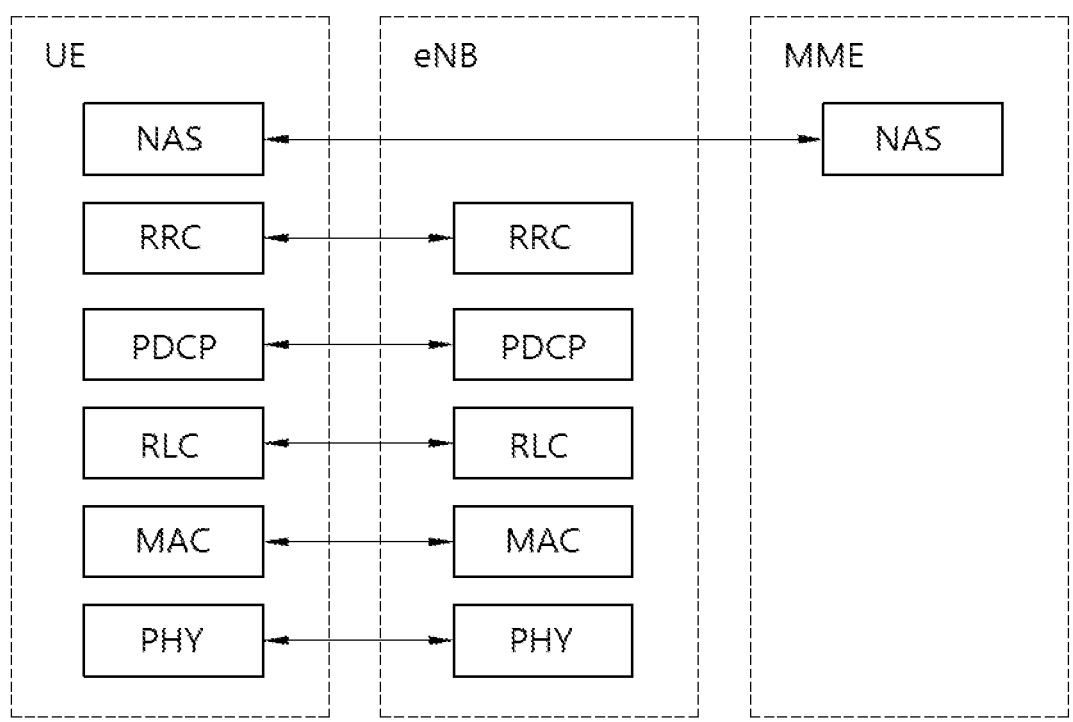
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane corresponds to a protocol stack for user data transmission, and the control plane corresponds to a protocol stack for control signal transmission.

Referring to FIG. 2 and FIG. 3, a physical (PHY) layer belongs to the L 1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (physical layer or PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC INACTIVE state is additionally defined, and a UE being in the RRC INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
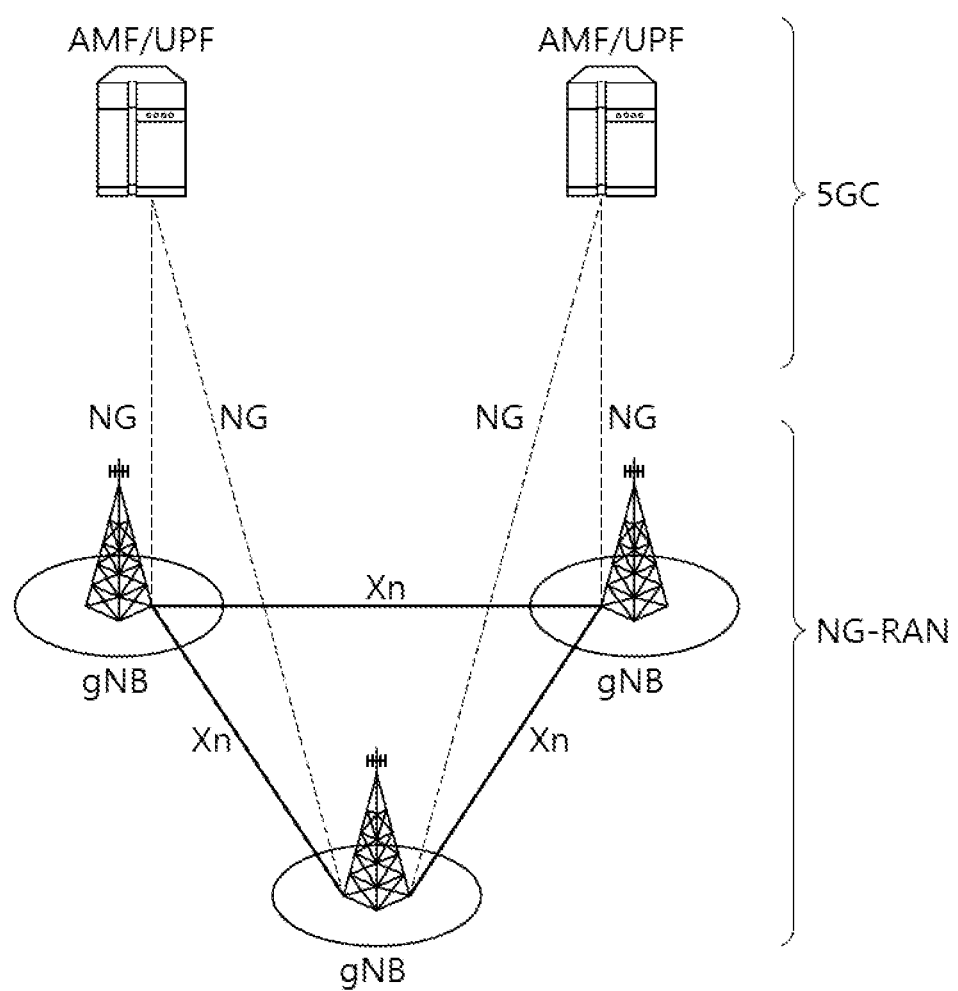
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation—Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
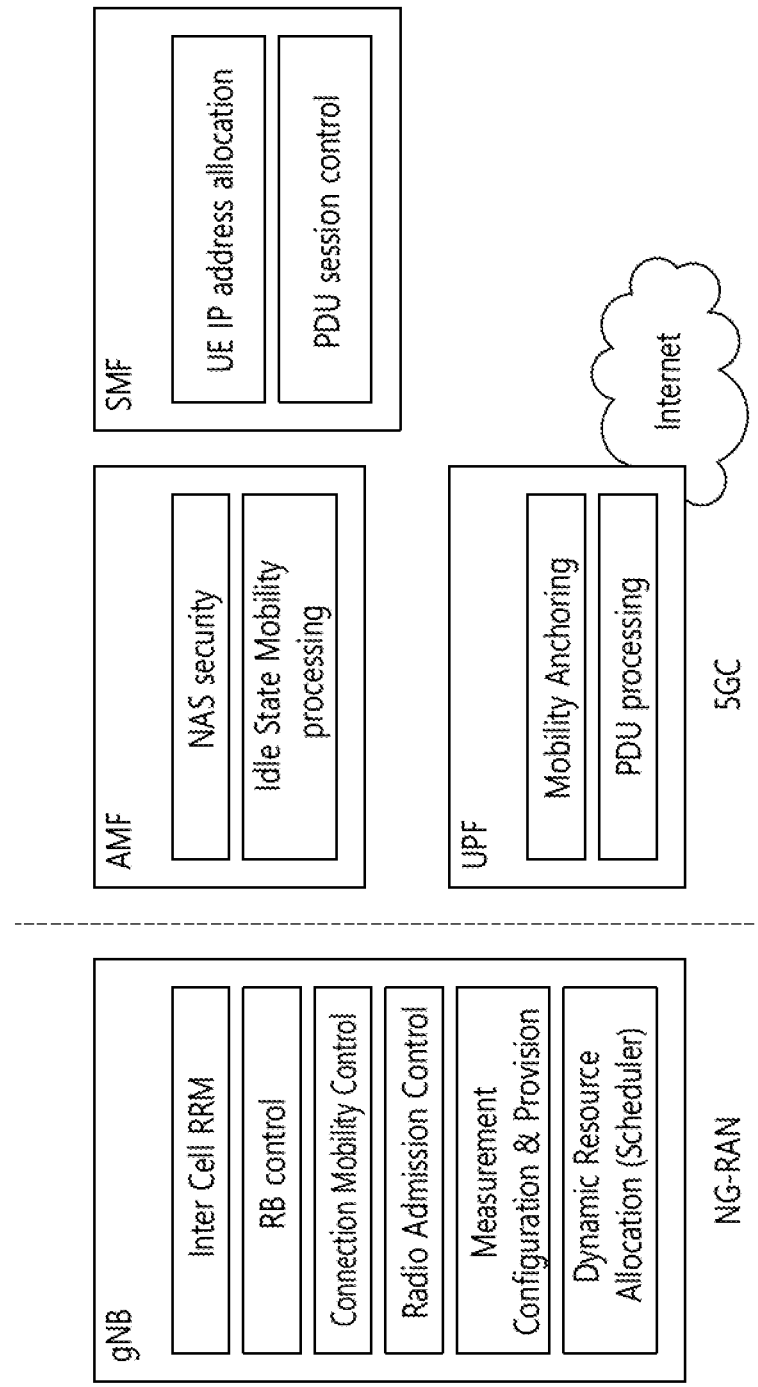
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
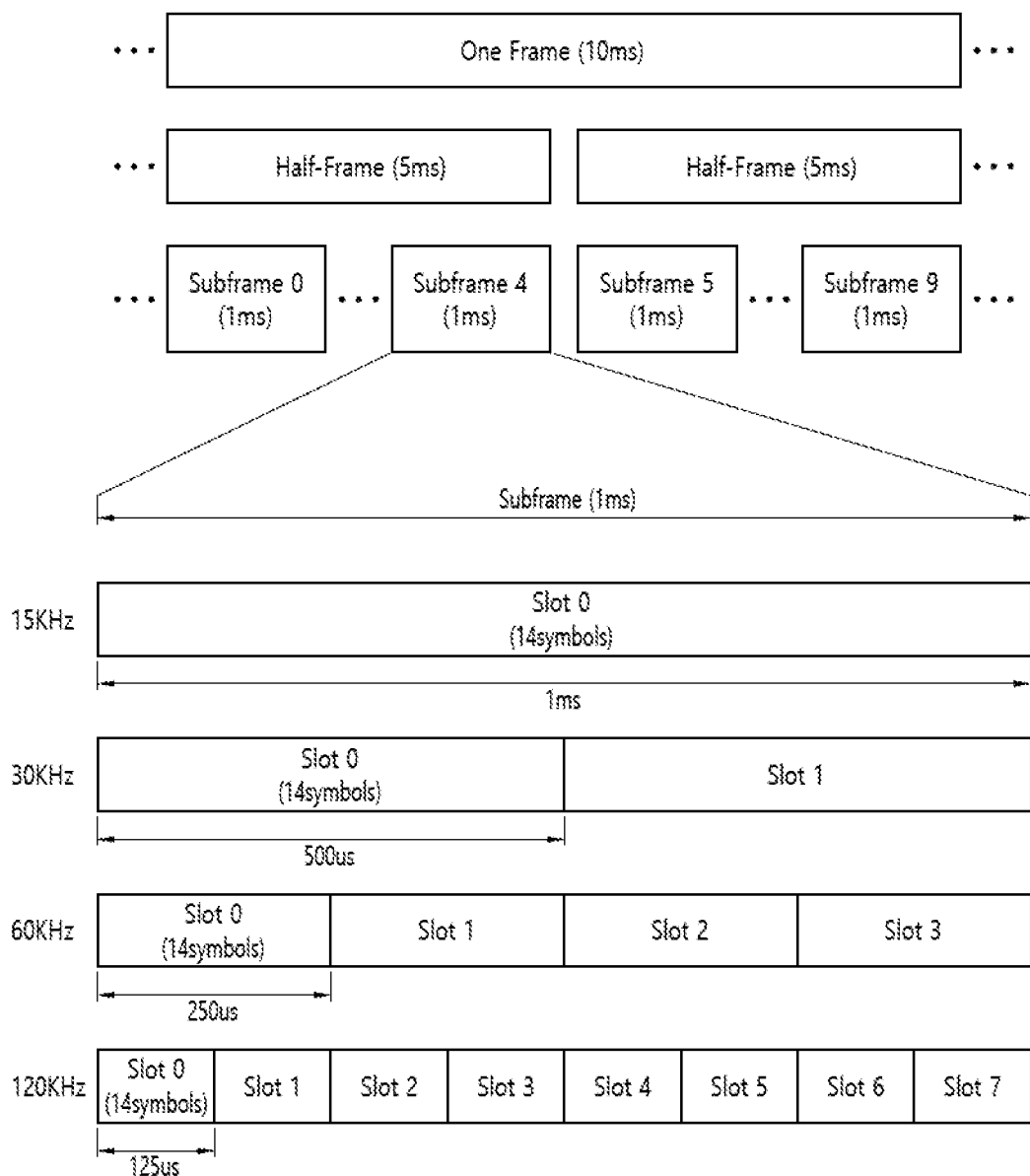
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 13

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 14

| Frequency Range designation | Corresponding frequency range | Subcarrier Spacing (SCS) |
|---|---|---|
| FR1 | 410 MHz–7125 MHz | 15, 30, 60 kHz |
| FR2 | 24250 MHz–52600 MHz | 60, 120, 240 kHz |

Figure 7:
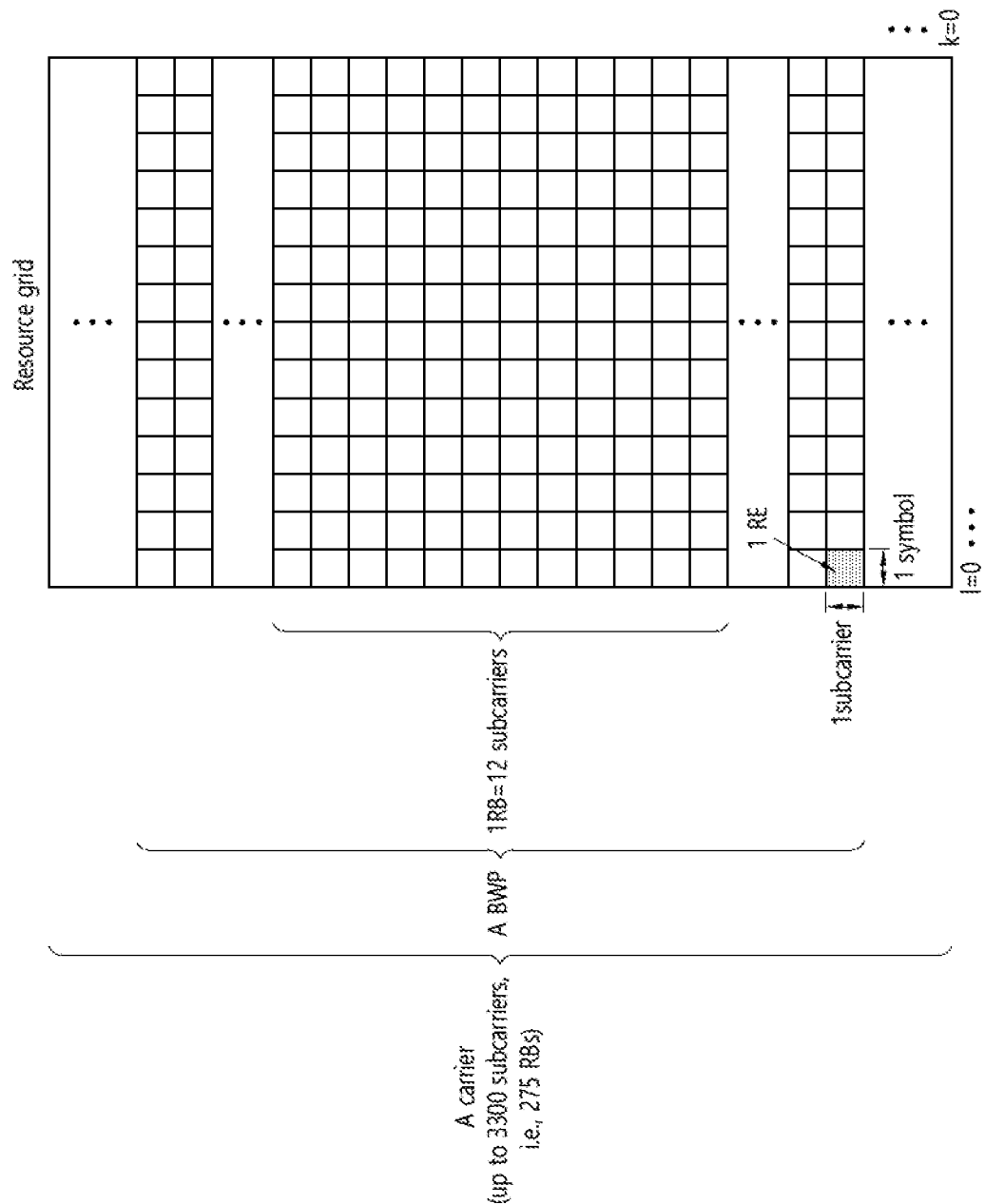
FIG. 7 shows a structure of a slot of an NR frame, in accordance with an embodiment of the present disclosure.

FIG. 7 shows a structure of a slot of an NR frame, in accordance with an embodiment of the present disclosure. Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 8:
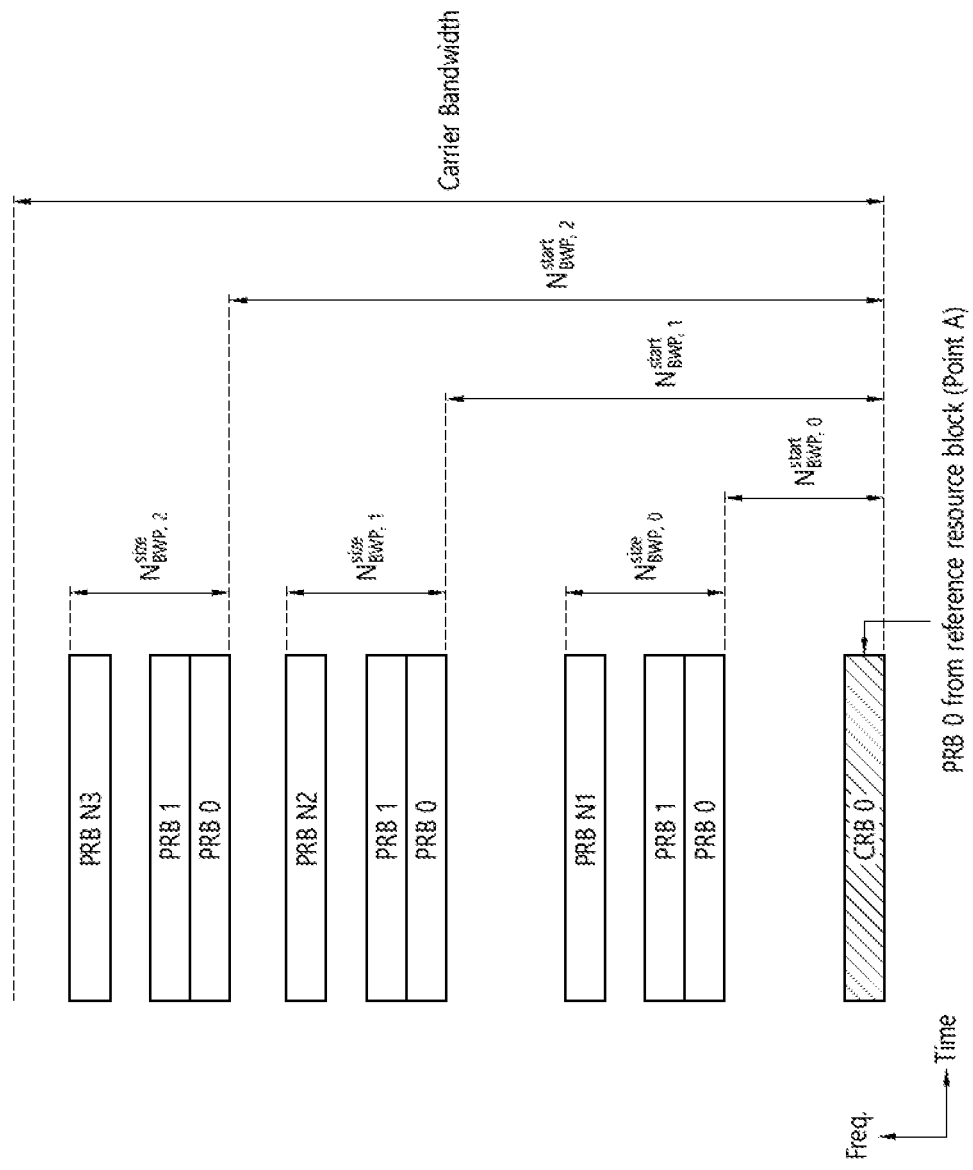
FIG. 8 shows a BWP based on an embodiment of the present disclosure.

FIG. 8 shows a BWP based on an embodiment of the present disclosure. It is assumed in the embodiment of FIG. 8 that the number of BWPs is 3.

Referring to FIG. 8, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 9A:
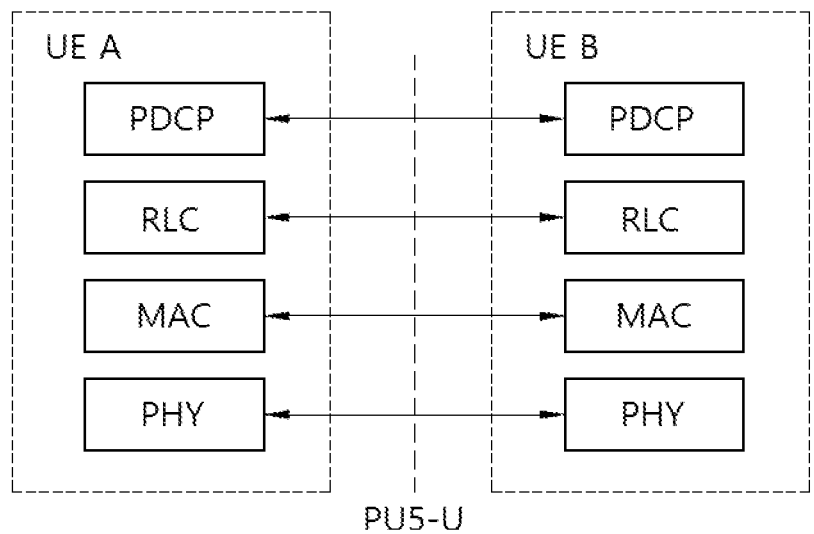
FIGS. 9A and 9B show a radio protocol architecture for a SL communication, in accordance with an embodiment of the present disclosure.
Figure 9B:
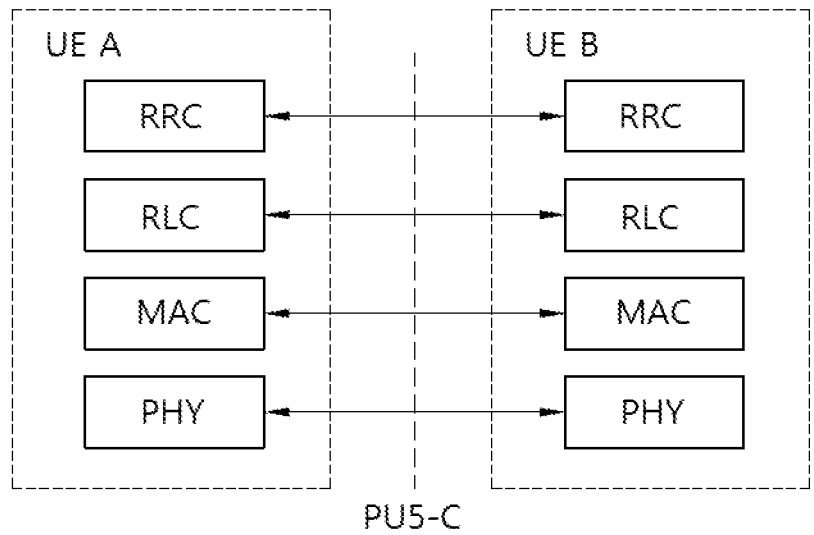

FIGS. 9A and 9B show a radio protocol architecture for a SL communication, in accordance with an embodiment of the present disclosure. The embodiment of FIGS. 9A and 9B may be combined with various embodiments of the present disclosure. More specifically, FIG. 9A shows a user plane protocol stack of LTE, and FIG. 9B shows a control plane protocol stack of LTE.

Figure 10A:
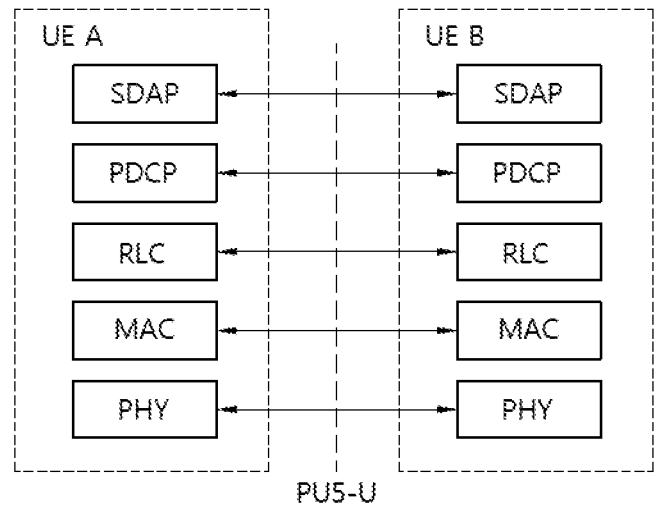
FIGS. 10A and 10B show a radio protocol architecture for a SL communication, in accordance with an embodiment of the present disclosure.
Figure 10B:
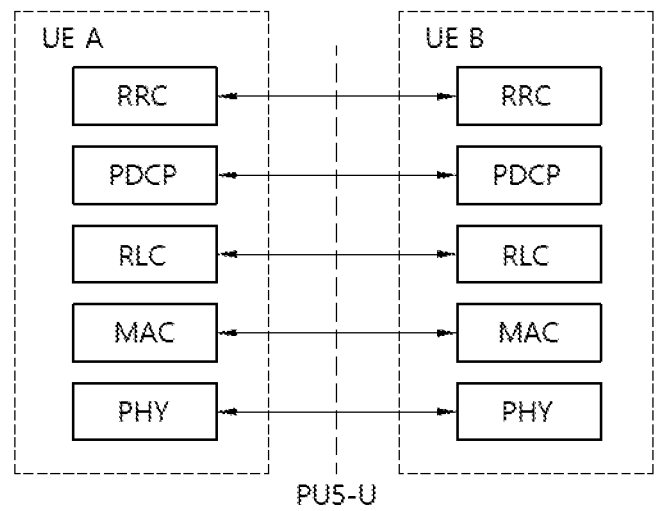

FIGS. 10A and 10B show a radio protocol architecture for a SL communication, in accordance with an embodiment of the present disclosure. The embodiment of FIGS. 10A and 10B may be combined with various embodiments of the present disclosure. More specifically, FIG. 10A shows a user plane protocol stack of NR, and FIG. 10B shows a control plane protocol stack of NR.

Hereinafter, a Sidelink Synchronization Signal (SLSS) and synchronization information will be described in detail.

The SLSS is a sidelink specific sequence, which may include a Primary Sidelink Synchronization Signal (PSSS) and a Secondary Sidelink Synchronization Signal (SSSS). The PSSS may be referred to as Sidelink Primary Synchronization Signal (S-PSS) and the SSSS may be referred to as Sidelink Secondary Synchronization Signal (S-SSS).

A Physical Sidelink Broadcast Channel (PSBCH) may refer to a (broadcast) channel through which (system) information, which consist of default (or basic) information that should first be known by the UE before the sidelink signal transmission/reception. For example, the default (or basic) information may be information related to the SLSS, a Duplex Mode (DM), TDD UL/DL configuration, information related to resource pools, types of applications related to the SLSS, a subframe offset, broadcast information, and so on.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. In addition, a frequency position of the S-SSB may be (pre-)configured. Accordingly, the UE does not need to perform hypothesis detection at frequency to discover the S-SSB in the carrier.

Each SLSS may have a physical layer sidelink synchronization identity (ID), and the values may be respectively equal to any one value ranging from 0 to 335. Depending upon any one of the above-described values that is used, a synchronization source may also be identified. For example, values of 0, 168, 169 may indicate the GNSS, values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
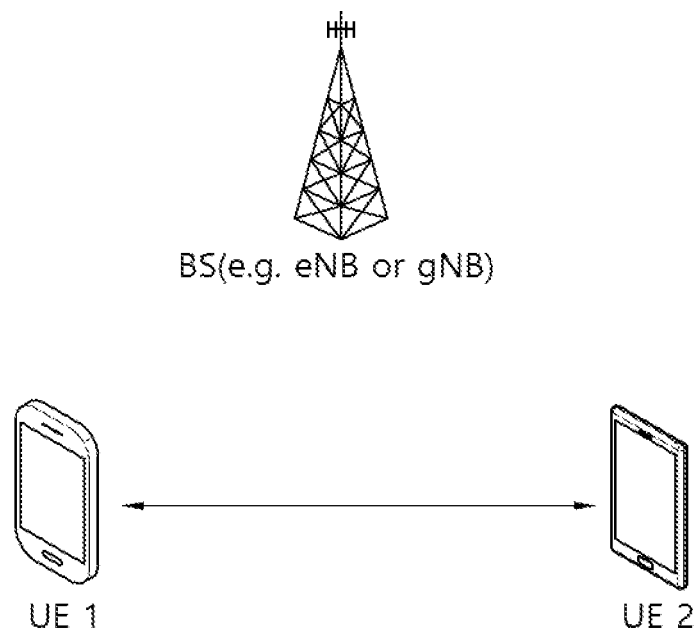
FIG. 11 shows a UE performing V2X or SL communication, in accordance with an embodiment of the present disclosure.

FIG. 11 shows a UE performing V2X or SL communication in accordance with an embodiment of the present disclosure.

Referring to FIG. 11, in V2X or SL communication, the term 'UE' may generally imply a UE of a user. However, if a network equipment such as a BS transmits/receives a signal based on a communication scheme between UEs, the BS may also be regarded as a sort of the UE.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 12:
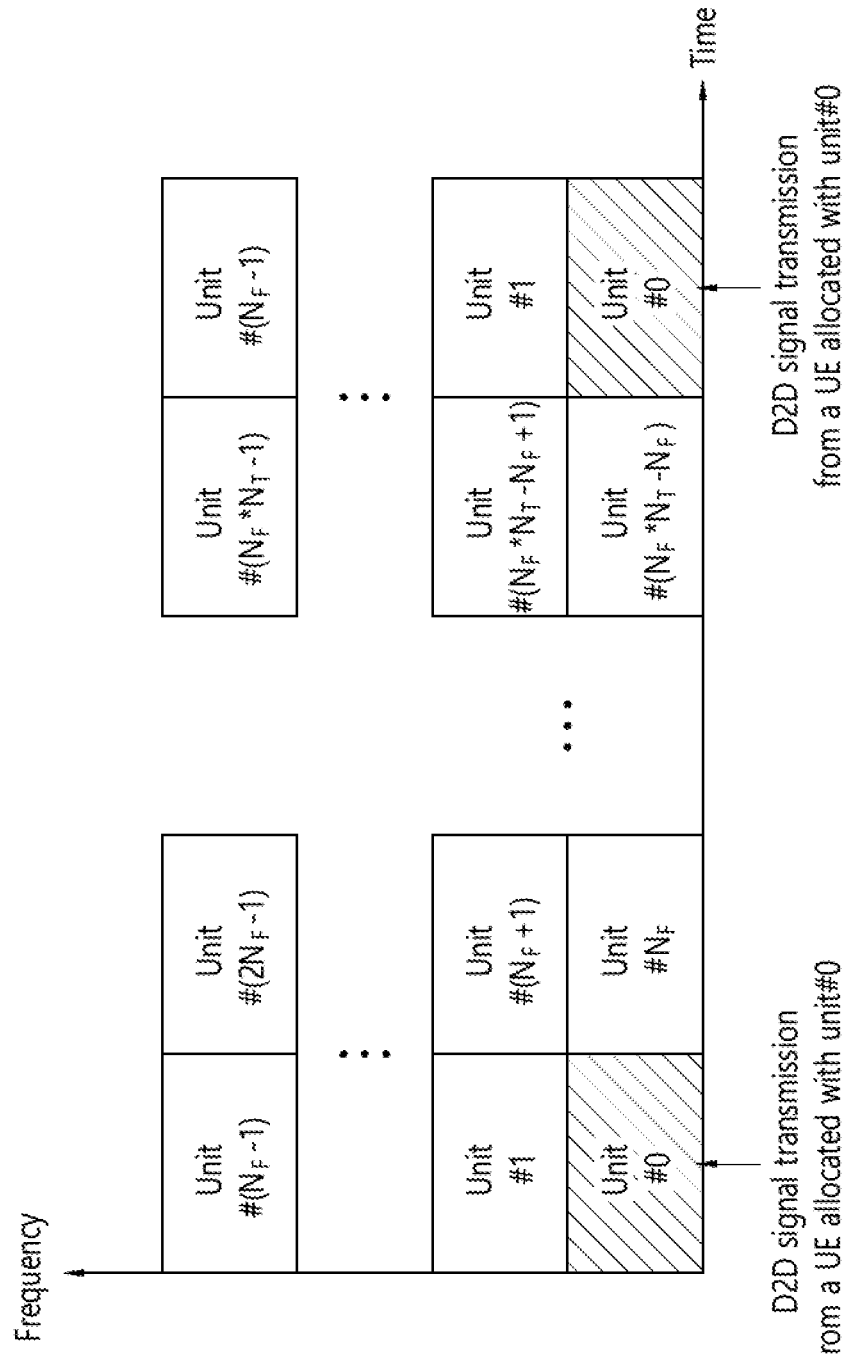
FIG. 12 shows a resource unit for V2X or SL communication based on an embodiment of the present disclosure.

FIG. 12 shows a resource unit for V2X or SL communication based on an embodiment of the present disclosure.

Referring to FIG. 12, all frequency resources of a resource pool may be divided into $N_F$ resources, and all time resources of the resource pool may be divided into $N_T$ resources. Therefore, $N_F*N_T$ resource units may be defined in the resource pool. FIG. A12 may show an example of a case where a corresponding resource pool is repeated with a period of $N_T$ subframes.

As shown in FIG. 12, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Hereinafter, a resource allocation in sidelink will be described.

Figures 13A, 13B:
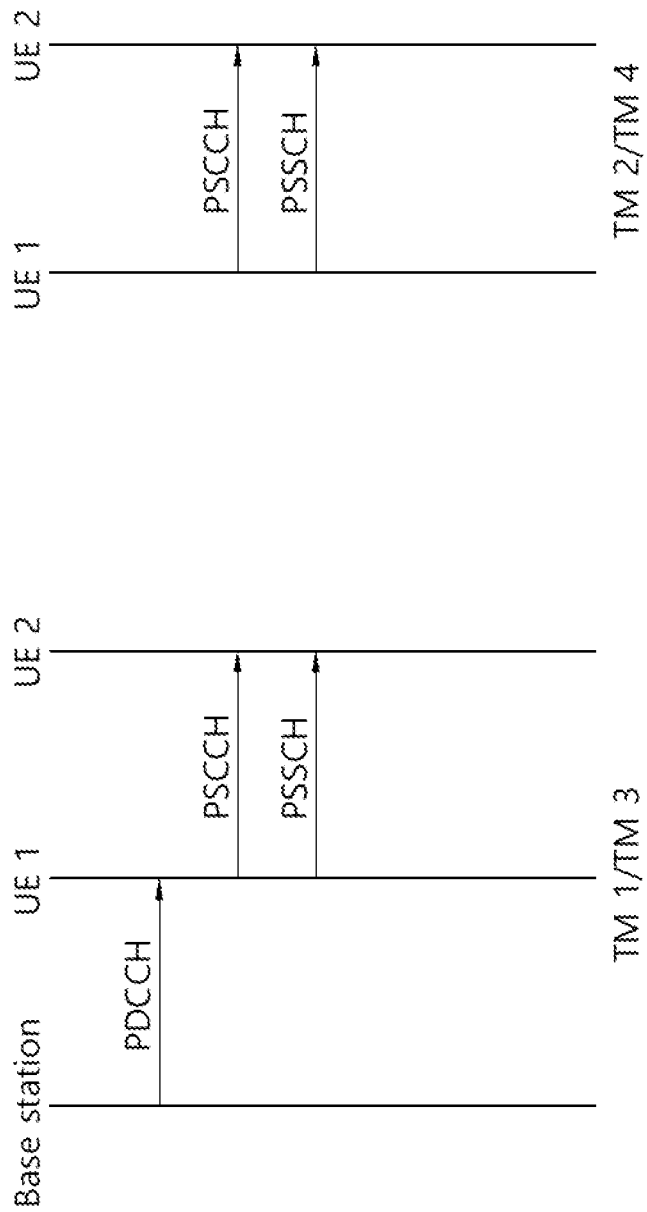
FIGS. 13A and 13B show exemplary UE operations according to a transmission mode (TM) related to V2X/D2D in accordance with an embodiment of the present disclosure.

FIGS. 13A and 13B show exemplary UE operations according to a transmission mode (TM) related to V2X/D2D in accordance with an embodiment of the present disclosure. More specifically, 13A shows UE operations related to Transmission mode 1 or Transmission mode 3, and FIG. 13B shows UE operations related to Transmission mode 2 or Transmission mode 4.

Referring to FIG. 13A, in Transmission modes 1/3, the base station performs resource scheduling to UE 1 through a PDCCH (more specifically, DCI), and UE 1 performs sidelink/V2X communication with UE 2 in accordance with the corresponding resource scheduling. After transmitting sidelink control information (SCI) to UE 2 through a physical sidelink control channel (PSCCH), UE 1 may transmit data that is based on the SCI through a physical sidelink shared channel (PSSCH). Transmission mode 1 may be applied to sidelink, and Transmission mode 3 may be applied to V2X.

Referring to FIG. 13B, in Transmission modes 2/4 may be modes according to which the UE performs self-scheduling. More specifically, Transmission mode 2 may be applied to sidelink, wherein the UE may select a resource by itself from a configured resource pool and perform sidelink operations. Transmission mode 4 may be applied to V2X, wherein, after performing sensing/SA decoding processes, and so on, the UE may select a resource by itself from a selection window and may then perform V2X operations. After transmitting SCI to UE 2, UE 1 may transmit data that is based on the SCI through the PSSCH. Hereinafter, the term Transmission mode may be abbreviated as Mode.

In case of NR sidelink, at least two types of sidelink resource allocation modes may be defined. In case of Mode 1, the base station may schedule sidelink resources that are to be used for sidelink transmission. In case of Mode 2, the user equipment (UE) may determine a sidelink transmission resource from sidelink resources that are configured by the base station/network or predetermined sidelink resources.

The configured sidelink resources or the predetermined sidelink resources may be a resource pool. For example, in case of Mode 2, the UE may autonomously select a sidelink resource for transmission. For example, in case of Mode 2, the UE may assist (or help) sidelink resource selection of another UE. For example, in case of Mode 2, the UE may be configured with an NR configured grant for sidelink transmission. For example, in case of Mode 2, the UE may schedule sidelink transmission of another UE. And, Mode 2 may at least support reservation of sidelink resources for blind retransmission.

Procedures related to sensing and resource (re-)selection may be supported in Resource Allocation Mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL Reference Signal Received Power (RSRP) measurement, which is based on a Demodulation Reference Signal (SL DMRS). The resource (re-)selection procedure may use a result of the sensing procedure in order to determine the resource for the sidelink transmission.

Figure 14:
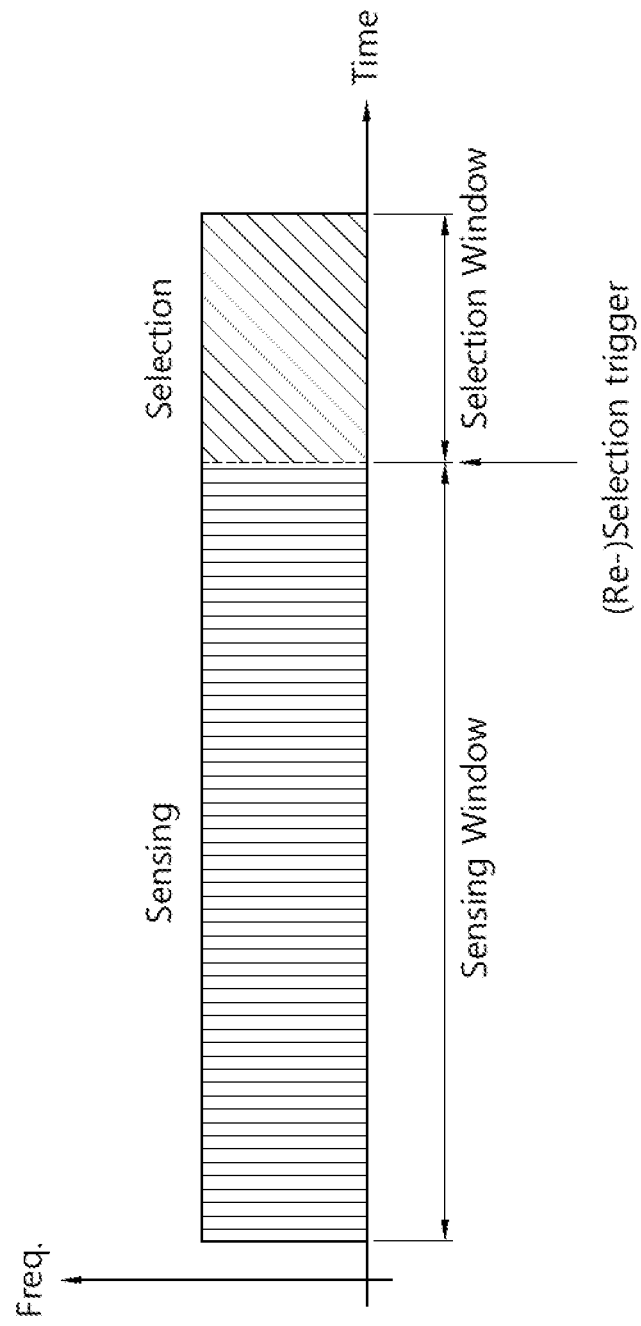
FIG. 14 shows an example of a selection of transmission resources in accordance with an embodiment of the present disclosure.

FIG. 14 shows an example of a selection of transmission resources in accordance with an embodiment of the present disclosure.

Referring to FIG. 14, by performing sensing within a sensing window, the UE may determine transmission resources reserved by another UE or transmission resources being used by another UE, and, after such transmission resources are excluded from the selection window, among the remaining resources, the UE may randomly select resources from resources having little interference.

For example, within the sensing window, the UE may decode the PSCCH including information on the cycle periods (or terms) of the reserved resources and may measure PSCCH RSRP from the periodically determined resources based on the PSCCH. The UE may exclude resources having the PSSCH RSRP that exceeds a threshold value from the selection window. Thereafter, the UE may randomly select sidelink resources from the remaining resources within the selection window.

Alternatively, the UE may measure Received signal strength indication (RSSI) of the periodic resources within the sensing window, so as to determine resources having little interference (e.g., resources corresponding to the lower 20%). And, among the periodic resources, the UE may randomly select sidelink resources from the resources included in the selection window. For example, in case the UE fails to perform decoding of the PSCCH, the UE may use the above-described method.

Hereinafter, a hybrid automatic repeat request (HARQ) procedure will be described.

An error compensation scheme for securing communication reliability may include a Forward Error Correction (FEC) scheme and an Automatic Repeat Request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme and it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in Resource Allocation Mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

When the SL HARQ feedback is enabled for unicast, in a non-code block group (non-CBG) operation, if the receiving UE successfully decodes a transport block, the receiving UE may generate HARQ-ACK. In addition, the receiving UE may transmit the HARQ-ACK to the transmitting UE. If the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

When the SL HARQ feedback is enabled for groupcast, the UE may determine whether to transmit HARQ feedback based on a transmission-reception (TX-RX) distance and/or RSRP. In the non-CBG operation, two HARQ feedback options may be supported for groupcast.

(1) Option 1: After the receiving UE decodes an associated PSCCH, if the receiving UE fails to decode the corresponding transport block, the receiving UE may transmit an HARQ-NACK over the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes an associated PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UR may also transmit an indication to a service base station of the transmitting UE in the form of a Scheduling Request (SR)/ Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

Figure 15:
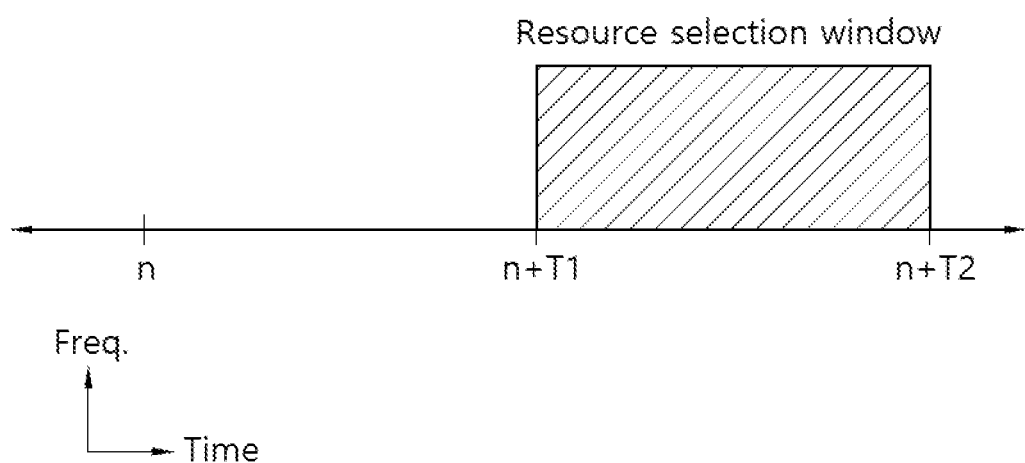
FIG. 15 shows an example of a resource selection window being configured based on processing timing of a UE and latency requirements of a packet that is to be transmitted by the UE.

FIG. 15 shows an example of a resource selection window being configured based on processing timing of a UE and latency requirements of a packet that is to be transmitted by the UE.

Referring to FIG. 15, the UE may configure a resource selection window, which is a time duration for allocating/selecting/determining a resource related to the transmission of sidelink information, as [n+T1, n+T2]. For example, n may denote a time point at which resource selection is triggered. For example, the UE may receive an n value from a higher layer. The UE may determine T1 based on a processing timing of the UE and may determine T2 based on latency requirements of a sidelink packet that is to be transmitted by the UE. For example, sidelink information may include at least one of sidelink data, sidelink control information, sidelink service(s), and/or sidelink packet(s).

Additionally, in case of unicast and groupcast, in order to satisfy a high reliability level of an enhanced service, the UE may perform HARQ feedback. However, in case the UE selects or determines a resource selection window for initial transmission being related to sidelink information based on latency requirements related to sidelink information and processing timing of the UE, due to a transmission time of HARQ feedback, it may be difficult for al transmissions including the last transmission of the sidelink to satisfy the service latency requirements. For example, in case the UE transmits sidelink information having a latency requirement of 50 ms, the UE may configure the T2 value based on the aforementioned latency requirement. For example, the UE may configure (or set) the T2 value to 40 ms. The UE may configure [n+T1, n+T2], which is range of resource selection windows, to [4 ms, 40 ms]. The UE may select a 30 ms resource after a sensing operation. However, after performing an initial transmission of sidelink information, in case the UE receives an HARQ-NACK feedback from a UE having received the sidelink information, the UE may perform retransmission of the sidelink information. For example, in case the UE selects a resource for retransmission, the UE may select a resource of a time domain exceeding 50 ms, which is the latency requirement. Therefore, in case retransmission of the sidelink information is expected, the UE may configure the resource selection window for initial transmission as a relatively shorter window. Thus, the UE may select or determine a resource for initial transmission being related to sidelink information within a time domain at a front part of the existing resource selection window (e.g., a resource selection window being configured based on latency requirements related to sidelink information and processing timing of the UE), and the UE may satisfy the latency requirements of the sidelink information. Additionally, even if retransmission of the sidelink information cannot be expected, the UE may configure and adjust the resource selection window for initial transmission based on parameters related to retransmission (e.g., maximum number of retransmissions, number of default retransmissions, or HARQ round trip time (RTT), and so on), parameters related to channel status and/or service QoS (e.g., priority, support conditions, and reliability of a service), and so on.

The present disclosure proposes a method for configuring, by a UE, a resource selection window based on information related to HARQ feedback.

According to the various embodiments of the present disclosure, a resource selection window may be a time duration for allocating/selecting/determining a resource related to the transmission of sidelink information. For example, a minimum value (or smallest value) of a resource selection window may be referred to as T1, and a maximum value (or largest value) of the resource selection window may be referred to as T2.

According to the various embodiments of the present disclosure, an HARQ RTT may be a time duration starting from a time point where the transmitting UE performs an initial transmission related to sidelink information to a time point where the transmitting UE performs retransmission related to sidelink information after receiving an HARQ feedback (e.g., HARQ-NACK) corresponding to the initial transmission. Additionally, for example, the HARQ RTT may be a sum of a first HARQ RTT and a second HARQ RTT. For example, the first HARQ RTT may be a time duration starting from a time point where the transmitting UE performs an initial transmission related to sidelink information to a time point where the transmitting UE receives an HARQ feedback (e.g., HARQ-NACK) corresponding to the initial transmission. For example, the second HARQ RTT may be a time duration starting from a time point where the transmitting UE receives an HARQ feedback (e.g., HARQ-NACK) corresponding to the initial transmission to a time point where the transmitting UE performed retransmission related to sidelink information. For example, the UE may determine or adjust a resource selection window based on a first HARQ RTT and/or a second HARQ RTT.

According to the various embodiments of the present disclosure, a maximum retransmission number may be a maximum number of retransmissions of sidelink information that can be performed by the transmitting UE. For example, the transmitting UE may configure or assume (in advance) a maximum retransmission number. For example, the maximum retransmission number may be referred to as MAX_RETX. For example, the transmitting UE may determine or configure a maximum retransmission number based on a resource selection window and an HARQ RTT. For example, the transmitting UE may determine or configure a maximum retransmission number in accordance with requirements related to service type or service QoS (e.g., latency requirements, reliability, or priority), and so on. For example, the transmitting UE may signal a maximum retransmission number, which is defined (in advance) by a higher layer or a network. For example, in case the UE is incapable of retransmitting data as many times as the maximum retransmission number, which is signaled from a higher layer or network, within a time duration of a resource selection window, the transmitting UE may change or configure the existing (or old) maximum retransmission number to a new maximum retransmission number, which is determined based on a resource selection window and an HARQ RTT. For example, a maximum retransmission number that is configured (in advance) by the transmitting UE or a maximum number of retransmissions that can actually be performed by the UE may be referred to as MAX_RETX_ACT or a first maximum retransmission number. For example, a MAX_RETX that is defined (in advance) by a higher layer or network may be referred to as MAX_RETX_NET or a second maximum retransmission number. For example, in case a floor((T2−T1)/HARQ RTT) value is equal to or greater than a second maximum retransmission number, the transmitting UE may determine or configure the maximum retransmission number as the second maximum retransmission number. Conversely, in case a floor((T2−T1)/HARQ RTT) value is less than a second maximum retransmission number, the transmitting UE may determine or configure the floor((T2−T1)/HARQ RTT) value as the first maximum retransmission number.

According to the various embodiments of the present disclosure, a default retransmission number may be a number of retransmissions of sidelink information that shall be performed by the transmitting UE. For example, the default retransmission number may be referred to as DEF_RETX. For example, in case DEF_RETX=4, this may denote that the transmitting UE must perform 4 retransmissions related to sidelink information.

According to the various embodiments of the present disclosure, information related to HARQ feedback may include parameters related to HARQ feedback. For example, parameters related to HARQ feedback may be signaled from a higher layer or network or may be received from another UE through a predefined channel. Alternatively, for example, the transmitting UE may transmit parameters related to HARQ feedback to another UE. For example, the UE may configure or define the parameters related to HARQ feedback as UE capabilities. For example, each UE may configure or define parameters related to HARQ feedback in accordance with the UE capability.

Figure 16:
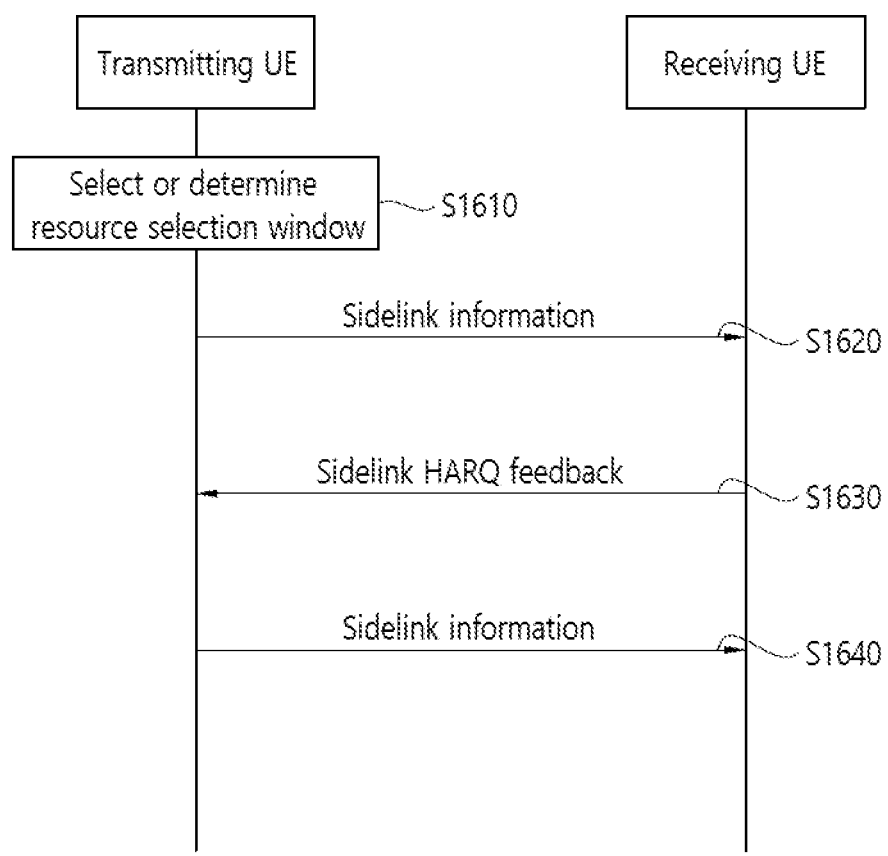
FIG. 16 shows a procedure of configuring, by a transmitting UE, a resource selection window based on information related to sidelink HARQ feedback, in accordance with an embodiment of the present disclosure.

FIG. 16 shows a procedure of configuring, by a transmitting UE, a resource selection window based on information related to sidelink HARQ feedback, in accordance with an embodiment of the present disclosure.

Referring to FIG. 16, in step S1610, a transmitting UE may select or determine a resource selection window. For example, the transmitting UE may select or determine a resource selection window based on latency requirements of sidelink information and processing timing of the transmitting UE. For example, the transmitting UE may determine whether or not sidelink HARQ feedback is needed. For example, before performing initial transmission of sidelink information, in case a specific condition is satisfied, the transmitting UE may determine that sidelink HARQ feedback is needed. For example, in case the transmitting UE determines that sidelink HARQ feedback is needed, the transmitting UE may adjust or change the resource selection window, which is selected or determined based on information related to sidelink HARQ feedback.

For example, the transmitting UE may determine whether or not sidelink HARQ feedback is needed based on at least one of a cast type (e.g., unicast, groupcast, or broadcast), information related to a channel status, capability of the transmitting UE, or priority and/or reliability of the sidelink information that is to be transmitted. For example, the information related to the channel status may include channel busy ratio (CBR) information and/or sidelink channel state information (CSI). For example, in case the CBR measured by the transmitting UE is greater than a preconfigured threshold value, the transmitting UE may determine that sidelink HARQ feedback is needed. For example, the sidelink CSI information may include information related to channel or interference status between the transmitting UE and a receiving UE. For example, the sidelink CSI information may include at least one of a channel quality indicator (CQI), a precoding matrix indicator (PMI), a rank indicator (RI), reference signal received power (RSRP), reference signal received quality (RSRQ), path-gain/pathloss, a sounding reference signal (SRS) resource indicator (SRI), a CSI-RS resource indicator (CRI), and an interference condition or vehicle motion. For example, in case the priority of the sidelink information and/or reliability of the sidelink information received from a higher layer or network is high, the transmitting UE may determine that sidelink HARQ feedback is needed. For example, whether or not sidelink HARQ feedback for specific sidelink information is needed may be signaled from a higher layer or network to the transmitting UE. For example, information related to sidelink HARQ feedback may include at least one of a maximum retransmission number, a default retransmission number, or an HARQ RTT.

In step S1620, the transmitting UE may transmit sidelink information to the receiving UE by using a resource within the selected or determined resource selection window.

In step S1630, the transmitting UE may receive an HARQ feedback related to sidelink information from the receiving UE. For example, the sidelink HARQ feedback may include an HARQ-ACK or HARQ-NACK.

In step S1640, the transmitting UE may transmit sidelink information to the receiving UE by using a resource after the selected or determined resource selection window. For example, in case the transmitting UE receives an HARQ-NACK from the receiving UE, the transmitting UE may retransmit sidelink information to the receiving UE by using the resource after the selected or determined resource selection window. For example, after receiving a sidelink HARQ feedback, the transmitting UE may newly select or determine a resource selection window.

Hereinafter, a method for selecting or determining, by a transmitting UE, a resource selection window based on information related to sidelink HARQ feedback will be described in detail.

Figure 17:
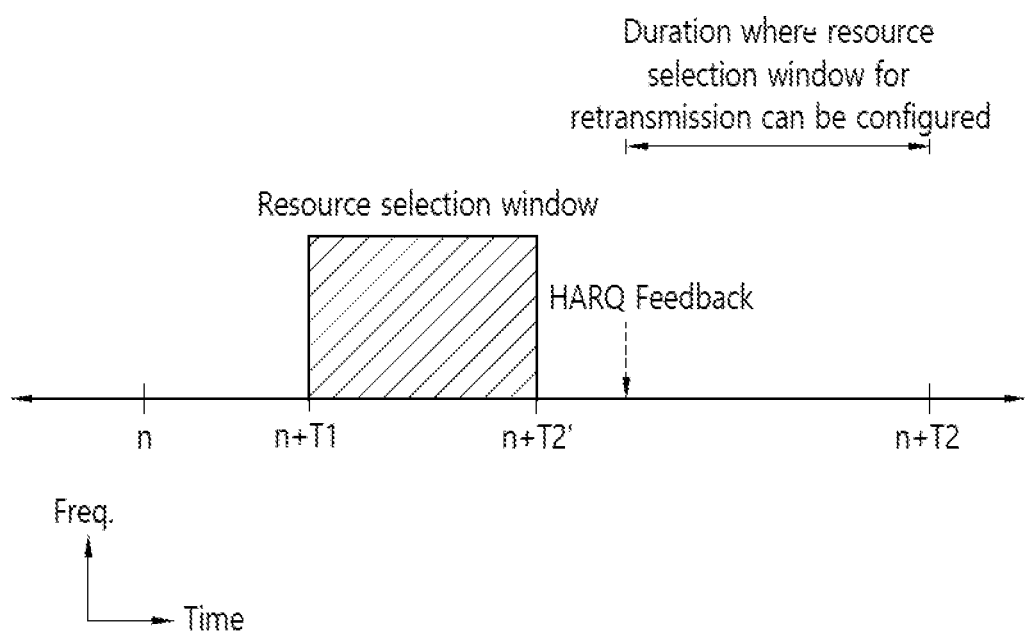
FIG. 17 shows an example of selecting or determining, by a transmitting UE, a resource selection window based on information related to sidelink HARQ feedback.

FIG. 17 shows an example of selecting or determining, by a transmitting UE, a resource selection window based on information related to sidelink HARQ feedback.

Referring to FIG. 17, a transmitting UE may configure a T1 value and/or T2 value of a resource selection window based on processing timing of the transmitting UE and latency requirements of service(s) that is/are to be transmitted. In case sidelink HARQ feedback is required, the transmitting UE may adjust the configured T1 value and/or T2 value. For example, the transmitting UE may adjust or change the configured T1 value and/or T2 value based on an HARQ RTT and a maximum allowed retransmission number (or a maximum number of allowed retransmissions). For example, the transmitting UE may adjust or change the configured T1 value and/or T2 value based on an HARQ RTT and a default retransmission number. For example, T2' may be a changed value of the configured T2 value. For example, the T2' value may be adjusted in accordance with various embodiments of the present disclosure.

<Method 1>

For example, T2' may be determined by Equation 1 or Equation 2, which are shown below.

$$T2'=\text{floor}((T2-T1)/\text{MIN\_RTT}/(\text{MAX\_RETX}+1)) \quad \text{[Equation 1]}$$

$$T2'=\text{floor}((T2-T1)/(\text{MIN\_RTT}/(\text{MAX\_RETX}+1))) \quad \text{[Equation 2]}$$

Herein, for example, MIN_RTT may be a minimum allowed time of the HARQ RTT. For example, MAX_RETX may be a maximum retransmission number, which is defined as described above. For example, MAX_RETX may be MAX_RETX_NET or MAX_RETX_ACT. For example, in the aforementioned Equation 1 or Equation 2, MAX_RETX may be substituted by or changed to a default retransmission number.

For example, the transmitting UE may determine how many times retransmission can be performed in accordance with the HARQ RTT within the resource selection window based on the HARQ RTT and the maximum allowed retransmission number. For example, the transmitting UE may determine how many times retransmission can be performed in accordance with the HARQ RTT within the determined or selected resource selection window by using the aforementioned Equation 1 or Equation 2.

<Method 2>

For example, T2' may be determined by Equation 3 or Equation 4, which are shown below.

$$T2'=\text{floor}((T2-T1)/\text{MAX\_RTT}/(\text{MAX\_RETX}+1)) \quad \text{[Equation 3]}$$

$$T2'=\text{floor}((T2-T1)/(\text{MAX\_RTT}/(\text{MAX\_RETX}+1))) \quad \text{[Equation 4]}$$

Herein, for example, MAX_RTT may be a maximum allowed time of the HARQ RTT. For example, MAX_RETX may be a maximum retransmission number, which is defined as described above. For example, MAX_RETX may be MAX_RETX_NET or MAX_RETX_ACT. For example, in the aforementioned Equation 3 or Equation 4, MAX_RETX may be substituted by or changed to a default retransmission number.

For example, in case the transmitting UE is incapable of actually selecting a resource within the minimum allowed time of the HARQ RTT due to a sensing-based channel access characteristic, the transmitting UE needs to configure a maximum allowed time of the HARQ RTT in order to manage transmission of sidelink information. For example, in case the transmitting UE selects a resource located in a front part of the resource selection window as the transmission resource in order to perform initial transmission of sidelink information, since a sidelink HARQ feedback resource corresponding to the transmission resource is being selected, the receiving UE may satisfy a short HARQ RTT and may perform sidelink HARQ feedback. Thus, the transmitting UE may select a resource being related to the retransmission of sidelink information (e.g., resource that is to retransmit sidelink information in response to the reception of an HARQ-NACK). Conversely, for example, in case the transmitting UE selects a resource located in a back part of the resource selection window as the transmission resource in order to perform initial transmission of sidelink information, since a HARQ feedback resource corresponding to the transmission resource is being selected, the HARQ RTT may become relatively longer. Therefore, the transmitting UE may be incapable of selecting a resource being related to the retransmission of sidelink information within a minimum allowed time of the HARQ RTT (e.g., a resource that is to retransmit sidelink information in response to the reception of an HARQ-NACK). Since the transmitting UE is required to perform initial transmission and retransmission(s) within the maximum allowed time of the HARQ RTT, the transmitting UE may adjust the resource selection window based on the maximum allowed time of the HARQ RTT.

<Method 3>

For example, T2' may be determined by Equation 5 or Equation 6, which are shown below.

$$T2'=\text{floor}((T2-T1)/(MAX\_RTT+a)/(MAX\_RETX+1)) \quad \text{[Equation 5]}$$

$$T2'=\text{floor}((T2-T1)/((MAX\_RTT+a)/(MAX\_RETX+1))) \quad \text{[Equation 6]}$$

Herein, for example, MIN_RTT may be a minimum allowed time of the HARQ RTT. For example, may be a maximum time value that can be delayed from the MIN_RTT. For example, may be a value that is mapped (in advance) or a value that is linked (in advance) to parameters related to a service or a QoS of the service (e.g., priority of the service, support condition or reliability of the service). For example, may be configured (in advance) for the transmitting UE by a higher layer or network. For example, MAX_RETX may be a maximum retransmission number, which is defined as described above. For example, MAX_RETX may be MAX_RETX_NET or MAX_RETX_ACT. For example, in the aforementioned Equation 5 or Equation 6, MAX_RETX may be substituted by or changed to a default retransmission number.

For example, the transmitting UE may configure the HARQ RTT as the MIN_RTT in order to adjust the T2 value, and the transmitting UE may configure an allowable maximum latency (or delay) value per HARQ RTT (MAX_RTT) in order to delay the MIN_RTT. Thereafter, the transmitting UE may adjust or change the T2 value based on the MIN_RTT value applying the maximum latency value.

<Method 4>

For example, the transmitting UE may adjust or change the selected or determined resource selection window based on the channel status measured by the transmitting UE. The transmitting UE may determine whether or not information related to the channel status measured by the transmitting UE (e.g., CBR) is within a predetermined (or preconfigured) range. In case the information related to the channel status is within the predetermined range, the transmitting UE may determine that sidelink HARQ feedback is needed. For example, in case the transmitting UE determines that sidelink HARQ feedback is needed, the transmitting UE may adjust or change T2 of the selected or determined resource selection window. For example, the transmitting UE may configure a T2 value of the resource selection window being mapped to the information related to the channel status measured by the transmitting UE (e.g., CBR). For example, the transmitting UE may adjust or change the T2 of the selected or determined resource selection window to the T2 value being mapped to the information related to the channel status measured by the transmitting UE (e.g., CBR). Alternatively, the transmitting UE may be signaled with a T2 value being mapped to a range of channel measurement information from a higher layer or network, and the transmitting UE may adjust or change the T2 of the selected or determined resource selection window to the signaled T2 value.

<Method 5>

For example, the transmitting UE may adjust a resource selection window based on priority of sidelink information that is to be transmitted and/or reliability information of the sidelink information that is to be transmitted. For example, in case the priority of sidelink information that is to be transmitted and/or the required reliability of the sidelink information that is to be transmitted is/are relatively high, the transmitting UE may need to perform sidelink HARQ feedback in order to satisfy the corresponding high level of priority or reliability, and the transmitting UE may adjust the T2 value of the selected or determined resource selection window. For example, the transmitting UE may configure a T2 value being mapped to information related to priority or reliability information. For example, the transmitting UE may adjust or change the T2 of the selected or determined resource selection window to the T2 value being mapped to information related to priority or reliability information. For example, the transmitting UE may signal a T2 value, which is configured by a higher layer or network based on the information related to priority or reliability information, and the transmitting UE may adjust or change the T2 of the selected or determined resource selection window to the signaled T2 value.

<Method 6>

For example, the transmitting UE may adjust a resource selection window based on UE capability. For example, the transmitting UE may configure a T2 value of the resource selection window based on parameters related to UE capability. For example, the parameters related to UE capability may include an OFDM numerology (e.g., subcarrier spacing), a DMRS pattern (e.g., whether or not the DMRS is loaded at the front of a time duration of a transmission slot). For example, in case the transmitting UE uses a front-loaded DMRS pattern of a time duration, the transmitting UE may configure the T2 value of the resource selection window with a predetermined (or preconfigured) T2 value. For example, the predetermined T2 value may be a relatively smaller T2 value. For example, the transmitting UE may signal a T2 value, which is configured by a higher layer or network based on the capability of the transmitting UE, and the transmitting UE may adjust or change the T2 of the selected or determined resource selection window to the signaled T2 value.

For example, the transmitting UE may determine a T2' value of a resource selection window based on part or various combinations of the above-described Method 1 to Method 6.

Meanwhile, according to the embodiment, the transmitting UE may configure a T2 value of a resource selection window to half of the resource selection window (i.e., (T2−T1)/2). After performing an initial transmission of sidelink information within the configured resource selection window, the transmitting UE may receive an HARQ feedback. For example, the transmitting UE may restrict (or limit) a maximum value of the resource selection window for a pre-defined service to (T2−T1)/k or (T2−T1)/2.

For example, the transmitting UE may predetermine (or preconfigure) or predefine a T2 value of a resource selection window to (T2−T1)/k. Herein, for example, k may be differently configured in accordance with various conditions.

For example, the transmitting UE may configure a k value based on a channel status measured by the transmitting UE. For example, the transmitting UE may configure a k value being linked to a CBR measured by the transmitting UE. For example, in case the channel status measured by the transmitting UE is poor (or not good), the transmitting UE may select or determine a smaller k value in order to prevent conflict when selecting resources between multiple UEs. Therefore, the transmitting UE may select a resource from a resource selection window that is broader (or wider) than the existing (or old) resource selection window. For example, in case the channel status measured by the transmitting UE is good, the transmitting UE may select or determine a greater k value. Therefore, the transmitting UE may select a resource from a resource selection window that is narrower than the existing (or old) resource selection window. Thereafter, the transmitting UE may select or determine a broader (or wider) resource selection window for selecting retransmission resources based on HARQ feedback.

For example, the transmitting UE may configure a k value based on priority and/or reliability of the sidelink information that is to be transmitted. For example, a higher layer or network may configure or define in advance mapping information of sidelink information that is to be transmitted. For example, the mapping information may be information related to a k value being mapped to QoS parameters (e.g., priority and/or reliability) of the sidelink information that is to be transmitted. For example, in case Service A requires a low latency requirement and a high reliability, the higher layer or network may preconfigure or predefine a k value being mapped to the QoS parameter of Service A to have a high value. Therefore, the transmitting UE may configure a resource selection window being related to Service A to a relatively short range based on the mapping information of Service A.

For example, the transmitting UE may configure a k value based on UE capability. For example, the transmitting UE may have a different physical format depending upon the capability of the transmitting UE. For example, in case the capability of the transmitting UE is high, the transmitting UE may support subcarrier spacing having a large (or great) value or support a URLLC through a DMRS pattern. Therefore, the transmitting UE may consider retransmission of sidelink information based on the UE capability. For example, by configuring the k value to a large (or great) value, the transmitting UE may configure a relatively narrow resource selection window during the initial transmission of sidelink information.

For example, the transmitting UE may configure a k value based on a maximum retransmission number or default retransmission number. For example, the transmitting UE may configure the maximum retransmission number or default retransmission number as the k value. However, for example, in case the transmitting UE configures the maximum retransmission number as the k value for a narrow resource selection window, a T2' value exceeding a T1 value of the narrow resource selection window may be derived. Therefore, the transmitting UE may configure the maximum retransmission number or default retransmission number as the k value for a sufficiently large resource selection window. Herein, for example, a sufficiently large resource selection window may be a resource selection window being equal to or greater than a predefined resource selection window range value. For example, in case the resource selection window, which is selected by the transmitting UE, is equal to or greater than a predefined resource selection window range value, the transmitting UE may configure the maximum retransmission number or default retransmission number as the k value.

For example, the transmitting UE may configure a k value based on at least one of priority and/or reliability information of the sidelink information that is to be transmitted, UE capability, and maximum retransmission number or default retransmission number.

Additionally, for example, in order to satisfy the latency requirements according to sidelink HARQ feedback, the transmitting UE may switch to a bandwidth part (BWP) or transmission resource pool having a different numerology. For example, after performing initial transmission of the sidelink information, the transmitting UE may receive an HARQ-NACK related to the sidelink information and may retransmit the sidelink information. Due to the retransmission of the sidelink information, the transmitting UE may determine that the transmitting UE has failed to satisfy the latency requirements. In such case, the transmitting UE may switch to a bandwidth part (BWP) or transmission resource pool having a different numerology.

Meanwhile, in case the receiving UE configures a resource selection window while considering only the latency requirements of a sidelink packet that is to be transmitted by the receiving UE, the receiving UE may not satisfy the latency requirements required by the feedback information. For example, the receiving UE may receive sidelink information being transmitted by the transmitting UE, and, then, the receiving UE may select or determine a resource selection window for the sidelink information that is to be transmitted by the receiving UE. For example, the receiving UE may transmit sidelink information (e.g., in a PSCCH/PSSCH piggyback format) including feedback information that is to be transmitted to the transmitting UE (e.g., sidelink HARQ feedback information or CSI feedback information). In this case, if the receiving UE does not consider the latency requirements of the feedback information, the receiving UE may be incapable of transmitting the piggy-backed feedback information to the transmitting UE within a predetermined time. Hereinafter, a method for configuring, by the receiving UE, a resource selection window based on information related to feedback will be described in detail.

Figure 18:
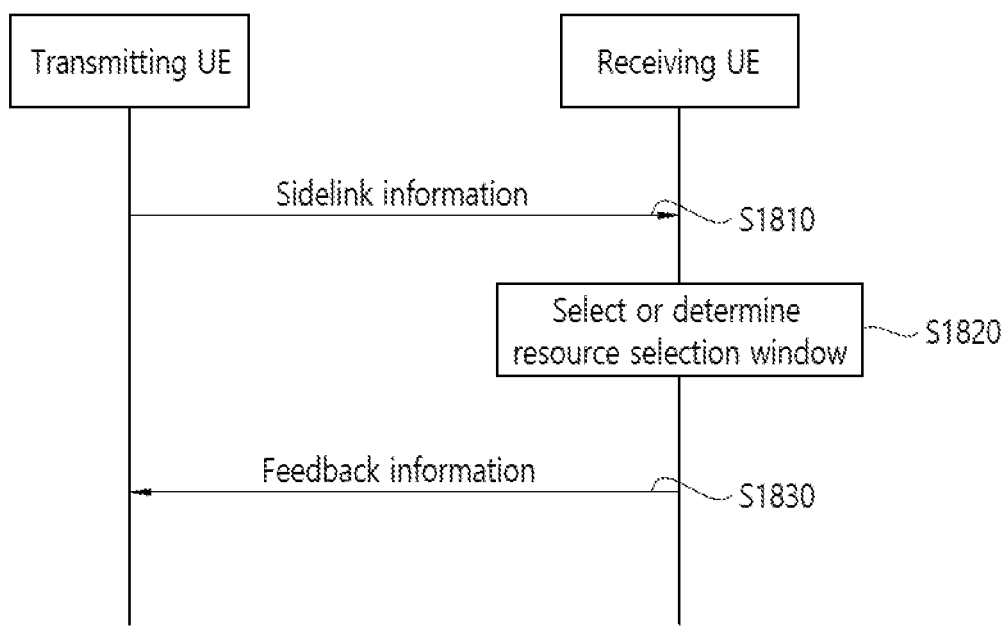
FIG. 18 shows a procedure of selecting or determining, by a receiving UE, a resource selection window based on information related to feedback.

FIG. 18 shows a procedure of selecting or determining, by a receiving UE, a resource selection window based on information related to feedback.

Referring to FIG. 18, in step S1810, a receiving UE may receive sidelink information from a transmitting UE. For example, sidelink information may include at least one of sidelink data, sidelink control information, sidelink service (s), and/or sidelink packet(s).

In step S1820, the receiving UE may select or determine a resource selection window. For example, the receiving UE may adjust its resource selection window based on information related to feedback corresponding to the sidelink information transmitted by the transmitting UE. For example, the feedback may include sidelink HARQ feedback or CSI feedback. For example, in case the receiving UE transmits sidelink HARQ feedback or CSI feedback to the transmitting UE, the receiving UE may adjust its resource selection window based on the sidelink HARQ feedback or CSI feedback.

For example, the receiving UE may configure the transmission latency requirement of a sidelink packet while also considering latency requirement of a sidelink service required by an application and latency requirements of each feedback information. For example, the receiving UE may determine the transmission latency requirement of a sidelink packet based on the latency requirement of a sidelink service required by an application and latency requirements of each feedback information. For example, in case the latency requirement of a sidelink service that is to be transmitted by the receiving UE is 100 ms, and in case the latency requirement of feedback information is 50 ms, the receiving UE may determine the latency requirement of the sidelink packet as 50 ms, which is the smaller value among the two latency requirements. Herein, for example, the information related to the feedback may include at least one of various information having different latency conditions, feedback type, or QoS parameters related to the feedback. For example, the sidelink HARQ feedback information being received by the receiving UE from the transmitting UE and the CSI feedback information reporting the channel status may be piggy-backed to sidelink control information or sidelink data that is to be transmitted by the receiving UE. In this case, for example, the receiving UE may determine the latency requirement having the smaller value, among the latency requirement related to the sidelink HARQ feedback information and latency requirement related to the CSI feedback information, as the latency requirement of the sidelink packet. For example, the latency requirement of the sidelink service and/or the latency requirement of the feedback information may be configured or defined (in advance) by a higher layer or network. For example, the receiving UE may determine the latency requirement for transmitting the sidelink information and/or feedback information based on the information being transmitted from the higher layer (e.g., QoS parameters). Herein, for example, the QoS parameters may include priority information and/or reliability information. For example, the higher layer or network may determine the latency requirement of the sidelink packet based on the latency requirement of a sidelink service and/or the latency requirement of the feedback information. Thereafter, the higher layer or network may notify the determined latency requirements of the sidelink packet to the receiving UE via QoS parameters or RRC signaling. Alternatively, for example, the higher layer or network may notify the latency requirement of a sidelink service and the latency requirement of feedback information to each receiving UE via QoS parameters or RRC signaling. The receiving UE may determine the latency requirement of a sidelink packet based on the latency requirement of the service and the latency requirement of feedback information, and, then, the receiving UE may select or determine a resource selection window based on the determined latency requirement of the sidelink packet.

For example, in case the receiving UE selects or determines a resource selection window based on the latency requirement of a sidelink service, and in case feedback information that is to be transmitted together at the transmission time point of the current receiving UE exists, the receiving UE may adjust or reconfigure the selected or determined resource selection window. More specifically, for example, in case the latency requirement of the sidelink service that is to be transmitted by the receiving UE is 100 ms, the receiving UE may select or determine a resource selection window for satisfying 100 ms in accordance with a resource selection window process. Thereafter, in case the receiving UE determines that feedback information requiring a smaller latency requirement exists, the receiving UE may additionally adjust or reconfigure the selected or determined resource selection window in order to satisfy the latency requirement of the feedback information.

For example, in case the receiving UE performs feedback to multiple transmission UEs, the receiving UE may simultaneously piggyback multiple feedback information to the sidelink information. In this case, the receiving UE may select or determine a resource selection window based on the latency requirements of the multiple feedback information. For example, in case a receiving UE and multiple transmitting UEs (e.g., A, B) exist, the receiving UE performs feedback to both transmitting UE A and transmitting UE B, and each feedback information may be piggy-backed to the transmission (e.g., PSCCH transmission or PSSCH transmission) of sidelink information of the receiving UE. The receiving UE may select or determine a resource selection window based on the information related to the feedback for transmitting UE A and the information related to the feedback for transmitting UE B. For example, in case the latency requirement of the feedback information for transmitting UE A is 22, the latency requirement of the feedback information for transmitting UE B is 23, and the latency requirement of the sidelink information of the receiving UE is 24, the receiving UE may determine min(22, 23, 24) as the final latency requirement. The receiving UE may select or determine a resource selection window based on the determined final latency requirement.

For example, the receiving UE may select or determine a resource selection window in accordance with the type of feedback information being fed-back to the transmitting UE. For example, the CSI feedback information may include RI, PMI, and CQI. For example, due to long term fading of a channel, the receiving UE may feed-back the CSI feedback information to the transmitting UE in a longer term. Alternatively, for example, the receiving UE may feed-back the CSI feedback information to the transmitting UE in a shorter term. For example, a long-term CSI may refer to information having a long reporting term and undergoing non-frequent RSRP or RSRQ change or a metric using the RSRP or RSRQ. For example, a short-term CSI may refer to information undergoing relatively faster change in accordance with the change in channels (e.g., PMI). Most particularly, since the channel changes faster in services having high mobility, the receiving UE may need to report the PMI in a short term. Therefore, the latency requirement may vary depending upon the type of feedback information. For example, the receiving UE may signal a different latency requirement for each feedback information. For example, the receiving UE may select or determine a resource selection window based on the type of feedback information being piggy-backed to the transmission of the sidelink information. For example, in case the PMI information is a short-term CSI, the receiving UE may piggy-back the PMI information to the transmission of the sidelink information, and the transmitting UE may configure the latency requirement of the sidelink information so that the latency requirement can support the short term required by the PMI information. Thereafter, the receiving UE may select or determine a resource selection window based on the short term required by the PMI information. Alternatively, for example, the receiving UE may select or determine a resource selection window based on the latency requirement of the sidelink information, and the receiving UE may additionally adjust or change the selected or determined resource selection window so as to support the short term required by the PMI information.

In step S1830, the receiving UE may transmit feedback information to the transmitting UE. For example, in case the feedback information is sidelink HARQ feedback information, the receiving UE may re-receive the sidelink information from the transmitting UE. For example, in case the feedback information is HARQ-NACK, the receiving UE may re-receive the sidelink information from the transmitting UE.

Figure 19:
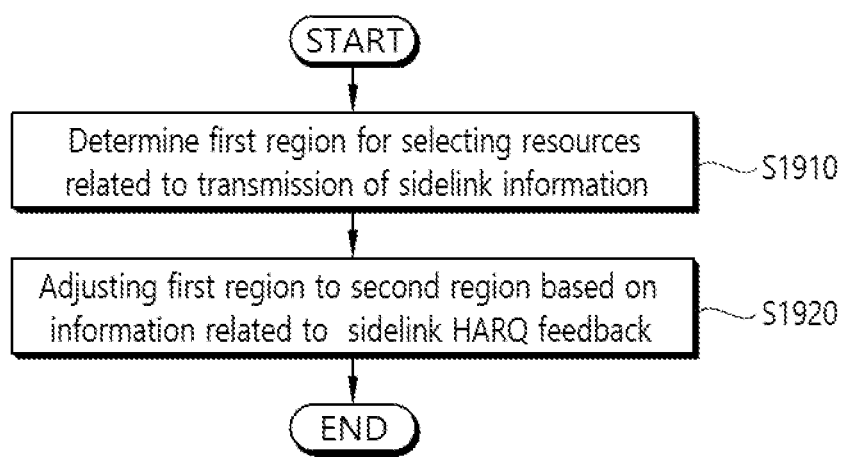
FIG. 19 shows a method for determining, by a first apparatus (100), a region for selecting resources related to transmission of sidelink information, in accordance with an embodiment of the present disclosure.

FIG. 19 shows a method for determining, by a first apparatus (100), a region for selecting resources related to transmission of sidelink information, in accordance with an embodiment of the present disclosure.

Referring to FIG. 19, in step S1910, a first apparatus (100) may determine a first region for selecting a resource related to a transmission of sidelink information. For example, the first region may be a resource selection window. For example, the sidelink information may include at least one of sidelink data, sidelink control information, sidelink service(s), and/or sidelink packet(s).

In step S1920, the first apparatus (100) may adjust the first region to a second region based on information related to a sidelink HARQ feedback. For example, the second region may be a resource selection window. For example, the information related to the sidelink HARQ feedback may include at least one of a maximum retransmission number, a default retransmission number, or an HARQ round trip time (RTT). For example, an HARQ RTT may be a time duration starting from a time point where the first apparatus (100) performs an initial transmission related to sidelink information to a time point where the first apparatus (100) performs retransmission related to sidelink information after receiving an HARQ feedback corresponding to the initial transmission. For example, a maximum retransmission number may be a maximum number of retransmissions of sidelink information that can be performed by the first apparatus (100). For example, a default retransmission number may be a number of retransmissions of sidelink information that shall be performed by the first apparatus (100).

For example, the first apparatus (100) may determine whether or not sidelink HARQ feedback is needed. In case the first apparatus (100) determines that sidelink HARQ feedback is needed, the first apparatus (100) may adjust the first region to a second region based on information related to the sidelink HARQ feedback. For example, the first apparatus (100) may determine whether or not sidelink HARQ feedback is needed based on at least one of a cast type, information related to a channel status, priority information related to the capability of the first apparatus (100) or the sidelink information, or reliability information related to the sidelink information.

For example, the first apparatus (100) may transmit the sidelink information to a second apparatus (200) by using resource within the second region.

Figure 20:
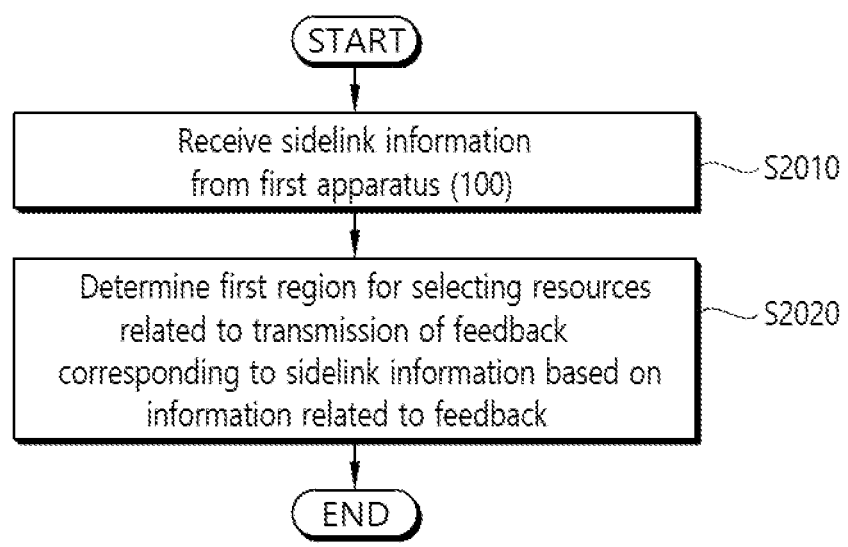
FIG. 20 shows a method for determining, by a second apparatus (200), a region for selecting resources related to transmission of feedback corresponding to sidelink information, in accordance with an embodiment of the present disclosure.

FIG. 20 shows a method for determining, by a second apparatus (200), a region for selecting resources related to transmission of feedback corresponding to sidelink information, in accordance with an embodiment of the present disclosure.

Referring to FIG. 20, in step S2010, a second apparatus (200) may receive sidelink information from a first apparatus (100).

In step S2020, the second apparatus may determine a first region for selecting a resource related to feedback corresponding to sidelink information based on information related to feedback. For example, sidelink information may include at least one of sidelink data, sidelink control information, sidelink service(s), and/or sidelink packet(s). For example, the feedback may be sidelink HARQ feedback or CSI feedback. For example, the first region may be a resource selection window. For example, information related to feedback may include at least one of latency requirements of feedback, feedback type, or QoS parameters related to the feedback. For example, the second apparatus (200) may transmit feedback to the first apparatus (100) by using resources within the first region. For example, in case the second apparatus (200) piggy-backs the feedback to sidelink information that is to be transmitted by the second apparatus (200), the second apparatus (200) may determine a first region based on the latency requirement having the smaller value, among the latency requirement of the sidelink information and the latency requirement of the feedback. For example, the second apparatus (200) may determine the first region based on sidelink information that is to be transmitted by the second apparatus (200), and the second apparatus (200) may adjust the first region to a second region based on information related to feedback corresponding to the sidelink information received from the first apparatus (100).

Since examples of the above-described proposed methods may also be included as one of the implementation methods of the present disclosure, it will be apparent that the examples of the above-described proposed methods may be viewed as part of the proposed methods. Additionally, although the above-described proposed methods may be implemented independently, the above-described proposed methods may also be implemented as a form of combination (or integration) of some of the proposed methods. Rules may be defined so that information on the application or non-application of the proposed methods (or information on rules of the proposed methods) can be notified to a UE by a base station, or to a receiving UE by a transmitting UE, through a predefined signal (e.g., physical layer signal or higher layer signal).

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
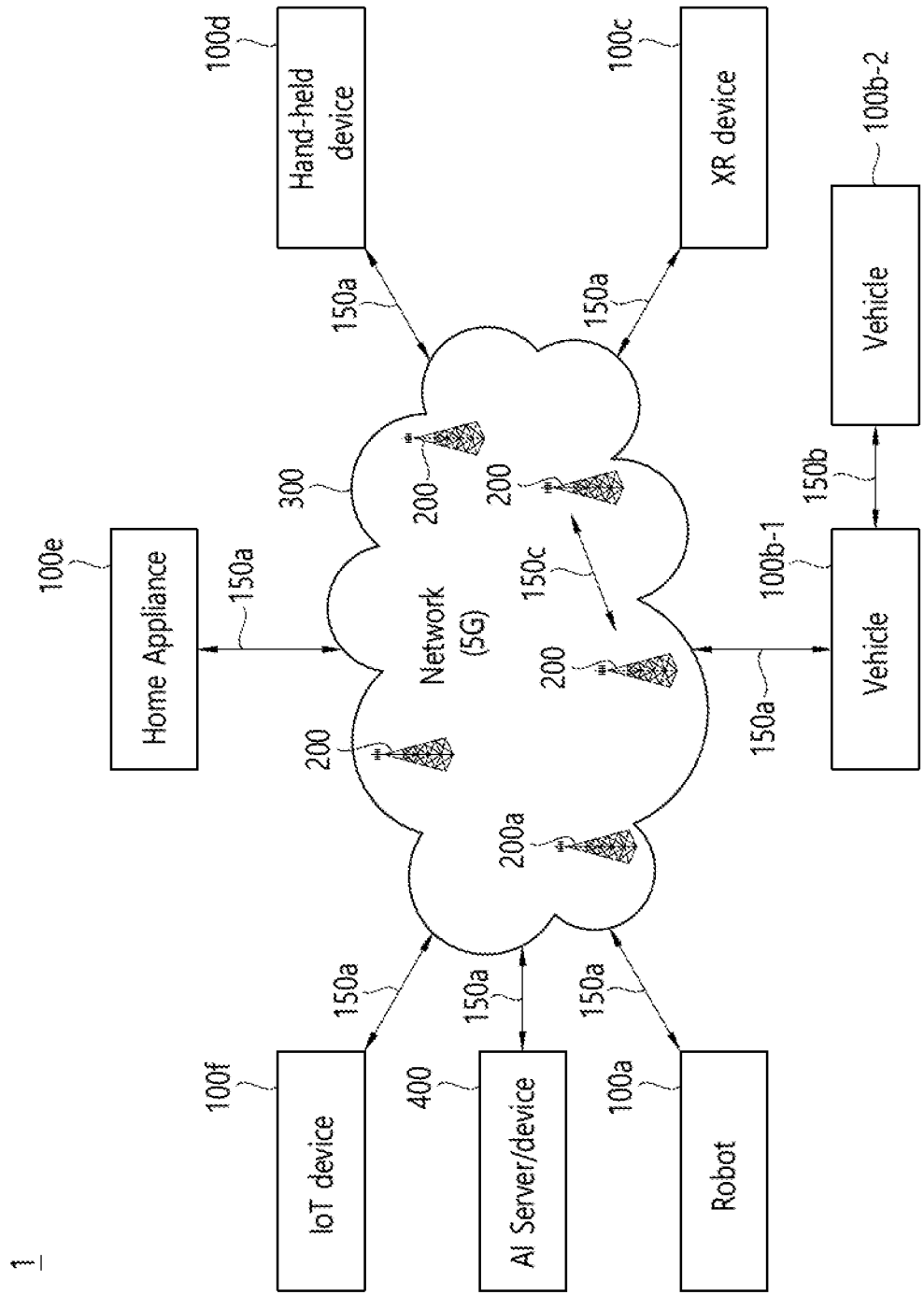
FIG. 21 shows a communication system (1), in accordance with an embodiment of the present disclosure.

FIG. 21 shows a communication system (1), in accordance with an embodiment of the present disclosure.

Referring to FIG. 21, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (TAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
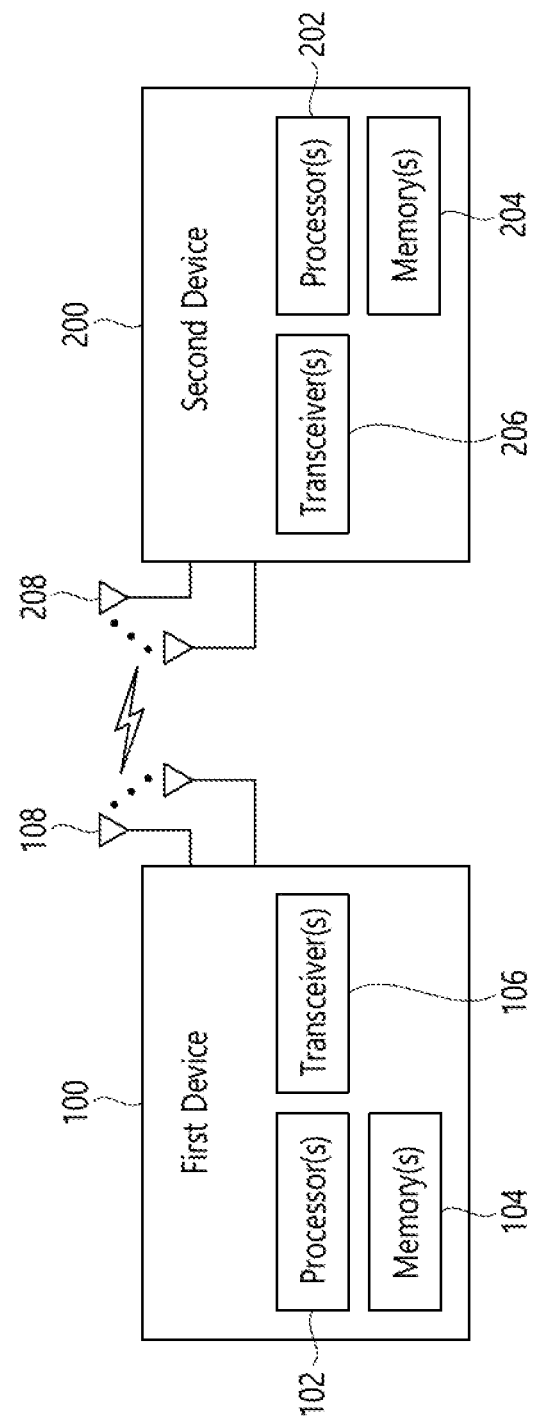
FIG. 22 shows wireless devices, in accordance with an embodiment of the present disclosure.

FIG. 22 shows wireless devices, in accordance with an embodiment of the present disclosure.

Referring to FIG. 22, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 21.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor (s) (202) and transmit and/or receive radio signals through one or more antennas (208). Each of the transceiver(s) (206) may include a transmitter and/or a receiver. The transceiver (s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 23:
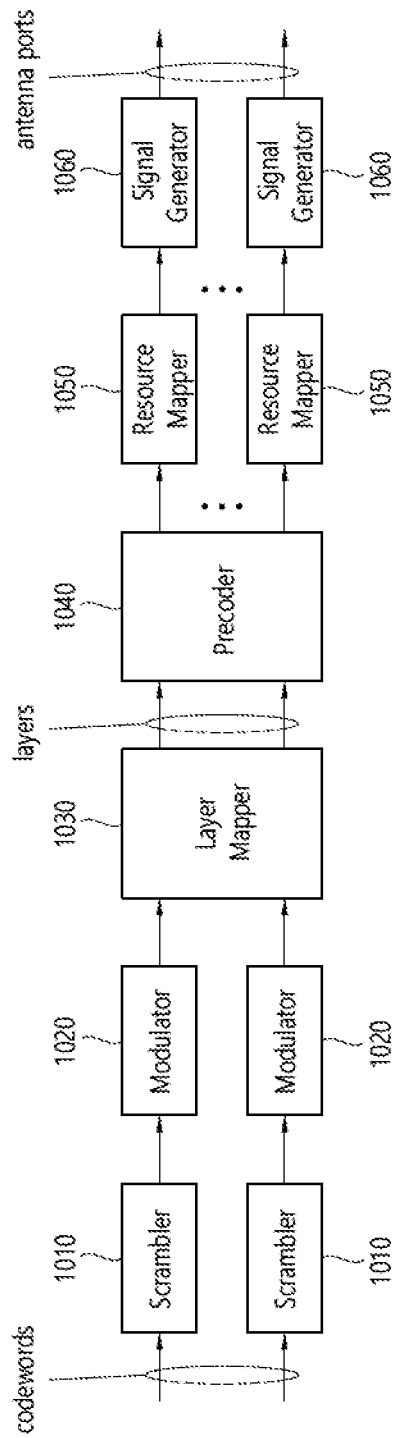
FIG. 23 shows a signal process circuit for a transmission signal, in accordance with an embodiment of the present disclosure.

FIG. 23 shows a signal process circuit for a transmission signal, in accordance with an embodiment of the present disclosure.

Referring to FIG. 23, a signal processing circuit (1000) may include scramblers (1010), modulators (1020), a layer mapper (1030), a precoder (1040), resource mappers (1050), and signal generators (1060). An operation/function of FIG. 23 may be performed, without being limited to, the processors (102, 202) and/or the transceivers (106, 206) of FIG. 22. Hardware elements of FIG. 23 may be implemented by the processors (102, 202) and/or the transceivers (106, 206) of FIG. 22. For example, blocks 1010~1060 may be implemented by the processors (102, 202) of FIG. 22. Alternatively, the blocks 1010~1050 may be implemented by the processors (102, 202) of FIG. 22 and the block 1060 may be implemented by the transceivers (106, 206) of FIG. 22.

Codewords may be converted into radio signals via the signal processing circuit (1000) of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 23. For example, the wireless devices (e.g., 100, 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
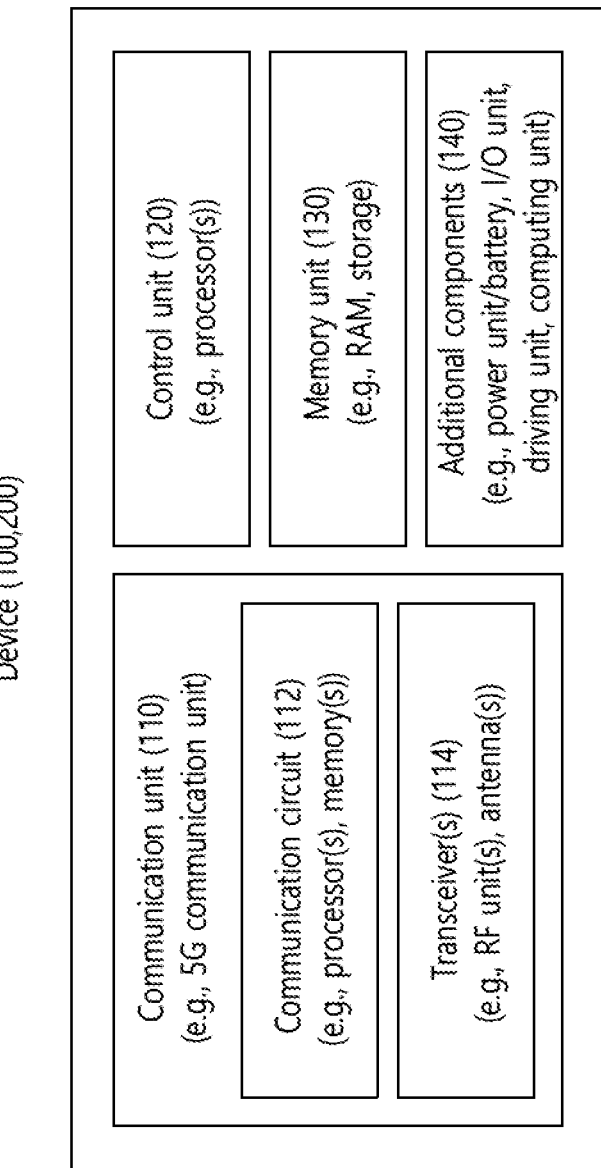
FIG. 24 shows another example of a wireless device, in accordance with an embodiment of the present disclosure.

FIG. 24 shows another example of a wireless device, in accordance with an embodiment of the present disclosure. The wireless device may be implemented in various forms according to a use-case/service (refer to FIG. 21).

Referring to FIG. 24, wireless devices (100, 200) may correspond to the wireless devices (100, 200) of FIG. 22 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 22. For example, the transceiver(s) (114) may include the one or more transceivers (106, 206) and/or the one or more antennas (108, 208) of FIG. 22. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 21), the vehicles (100b-1, 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, and so on. The wireless device may be used in a mobile or fixed place according to a use-example/service.

In FIG. 24, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
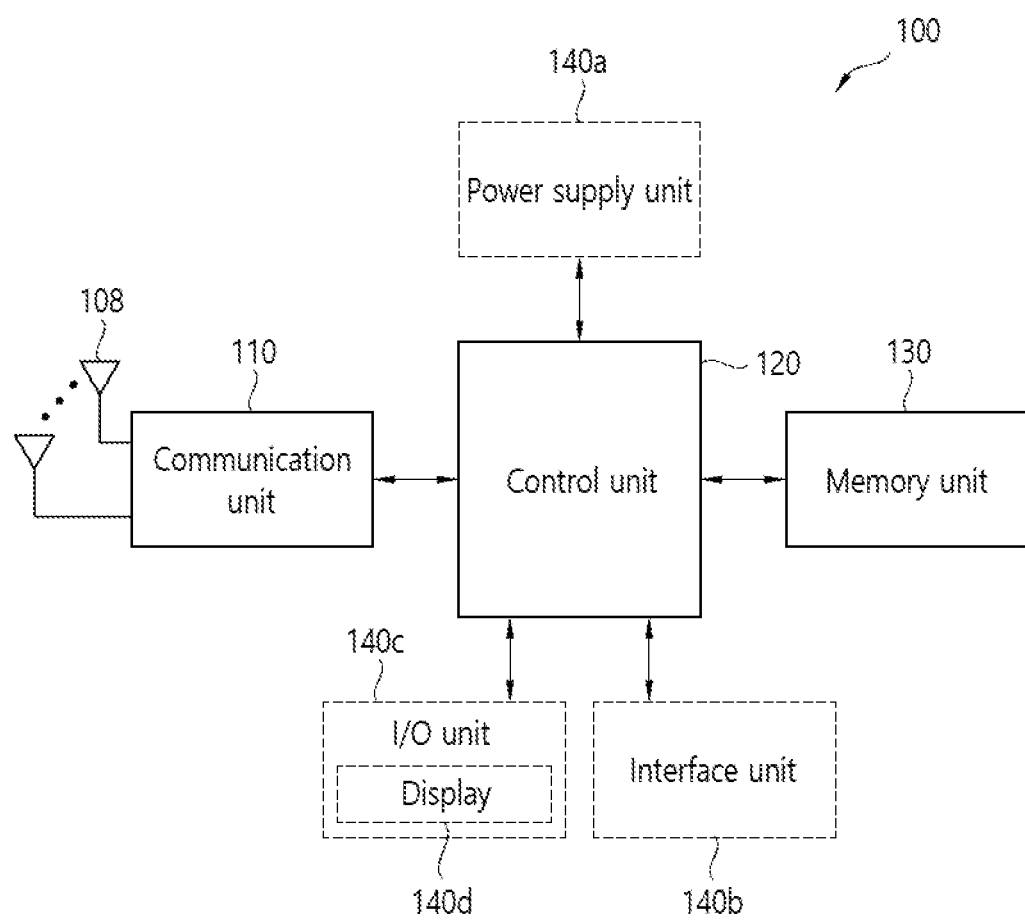
FIG. 25 shows a hand-held device, in accordance with an embodiment of the present disclosure.

FIG. 25 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 24, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 26:
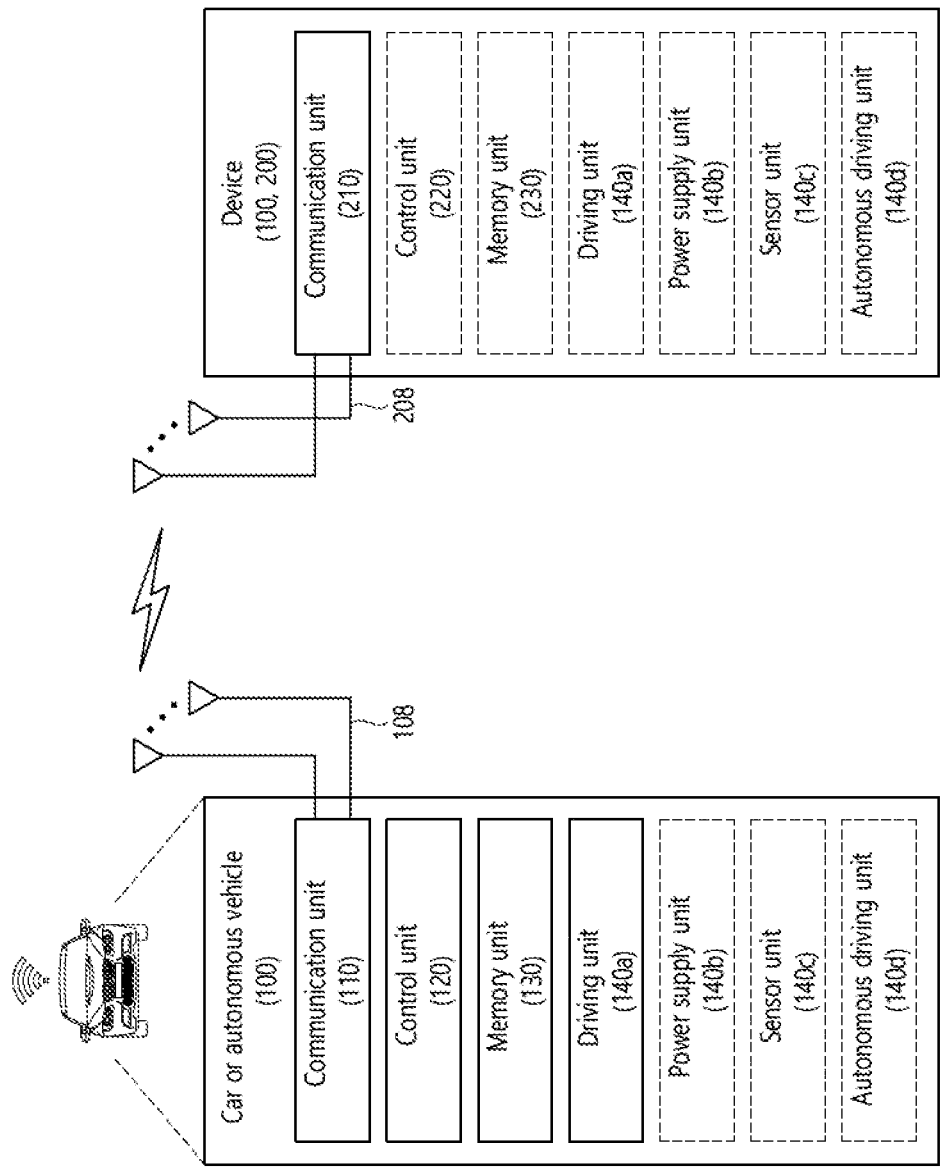
FIG. 26 shows a vehicle or an autonomous vehicle, in accordance with an embodiment of the present disclosure.

FIG. 26 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 26, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 24, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 27:
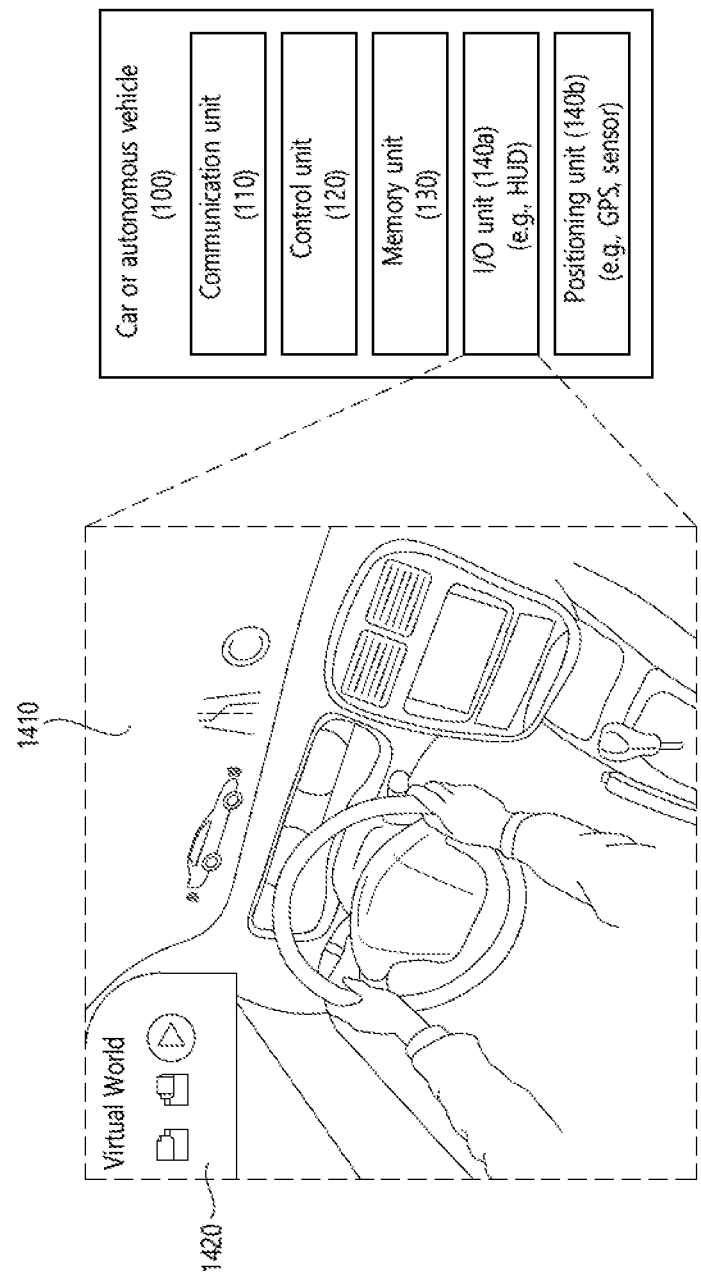

FIG. 27 shows a vehicle, in accordance with an embodiment of the present disclosure. The vehicle may be implemented as a transport means, an aerial vehicle, a ship, and so on.

Referring to FIG. 27, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 24.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 28:
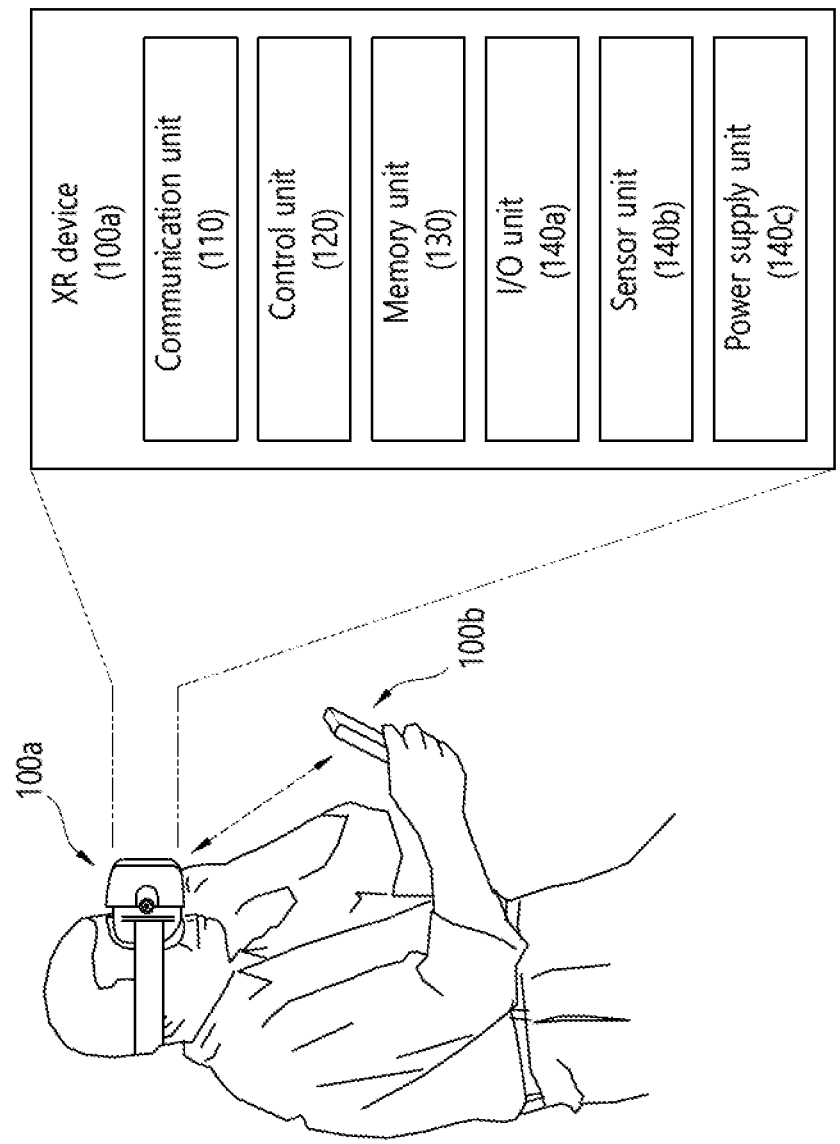
FIG. 28 shows an XR device, in accordance with an embodiment of the present disclosure.

FIG. 28 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 28, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 24, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, and so on. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, and so on.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device 100b) or a media server through the communication unit (130). The communication unit (130) may download/stream content such as films or news from another device (e.g., the hand-held device 100b) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 29:
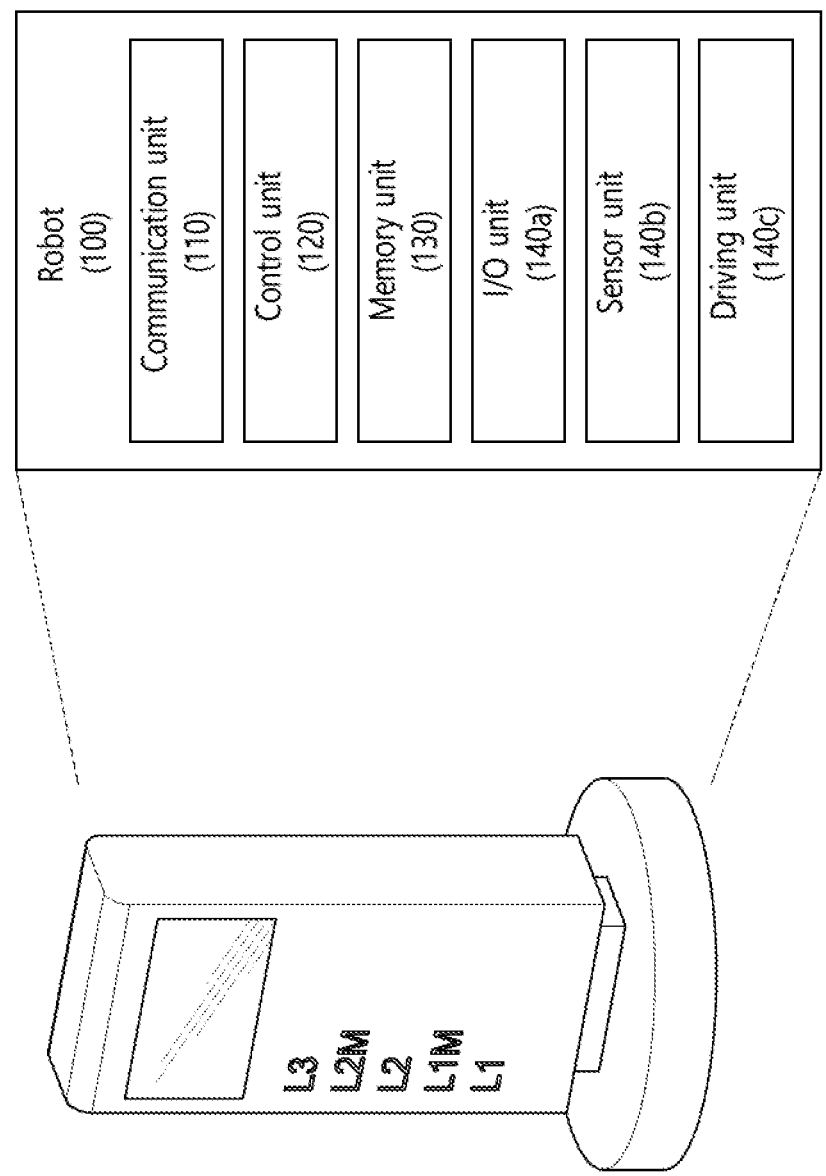
FIG. 29 shows a robot, in accordance with an embodiment of the present disclosure.

FIG. 29 shows a robot, in accordance with an embodiment of the present disclosure. The robot may be categorized into an industrial robot, a medical robot, a household robot, a military robot, and so on, according to a used purpose or field.

Referring to FIG. 29, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 24, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 30:
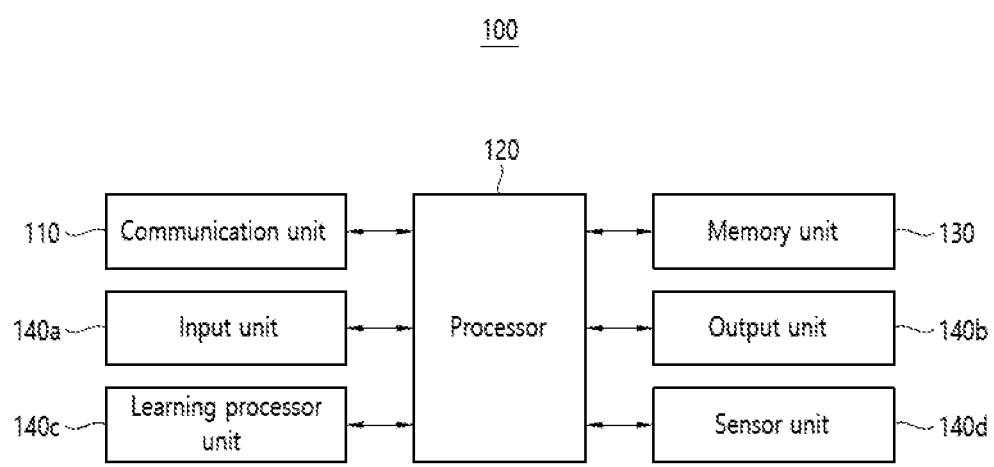
FIG. 30 shows an AI device, in accordance with an embodiment of the present disclosure.

FIG. 30 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 30, an AI device (100) may include a communication unit (110), a control unit (120), a memory unit (130), an I/O unit (140a/140b), a learning processor unit (140c), and a sensor unit (140d). The blocks 110~130/140a-140d correspond to blocks 110~130/140 of FIG. 24, respectively.

The communication unit (110) may transmit and receive wired/radio signals (e.g., sensor information, user input, learning models, or control signals) to and from external devices such as other AI devices (e.g., 100x, 200, 400 of FIG. 21) or an AI server (e.g., 400 of FIG. 21) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 21). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data.

The learning processor unit (140c) may perform AI processing together with the learning processor unit of the AI server (400 of FIG. 21). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

Claims in the present description may be combined in various ways. For example, technical features in method claims of this specification may be combined to be implemented or performed in an apparatus, and technical features in apparatus claims may be combined to be implemented or performed in a method. Additionally, technical features in the method claim(s) and the apparatus claim(s) may be combined to be implemented or performed in an apparatus. Furthermore, technical features in method claim(s) and apparatus claim(s) may be combined to be implemented or performed in a method.

What is claimed is:

1. A method for performing a first apparatus in a wireless communication system, the method comprising:
    determining a resource selection window for selecting a resource related to sidelink (SL) transmission,
    wherein an end of the resource selection window is determined based on a delay budget of a packet;
    based on SL hybrid automatic repeat request (HARQ) feedback being configured, selecting a first SL resource and a second SL resource from a subset of resources related to the SL transmission, (i) ensuring a minimum time gap between two resources and (ii) within the resource selection window of which the end is determined based on the delay budget of a packet,
    wherein the minimum time gap is a time gap required (i) from a time the first apparatus transmits data to a second apparatus (ii) to a time the first apparatus retransmits data to the second apparatus based on a reception of the SL HARQ feedback; and
    transmitting, to the second apparatus, data in which the SL HARQ feedback is enabled, based on the first SL resource.

2. The method of claim 1,
    wherein the resource selection window includes at least one of a first resource selection window or a second resource selection window,
    wherein the first SL resource is selected based on the minimum time gap in the at least one of the first resource selection window or the second resource selection window, and
    wherein the second SL resource is selected based on the minimum time gap in the at least one of the second resource selection window or the second resource selection window.

3. The method of claim 1, further comprising:
    receiving an SL HARQ NACK for the data from the second apparatus; and
    retransmitting the data to the second apparatus based on the second SL resource.

4. The method of claim 1, further comprising:
    sensing at least one resource related to the SL transmission, and
    wherein the first SL resource and the second SL resource are selected from remaining resources except resources excluded by the sensing, (i) ensuring the minimum time gap between two resources and (ii) within the resource selection window of which the size is determined based on the delay budget of a packet.

5. The method of claim 1, further comprising:
receiving, from a base station, information indicating whether to enable or disable the SL HARQ feedback,
wherein a maximum number of retransmissions related to the resource is configured, and
wherein the data is transmitted a number of times that is equal to or less than the maximum number of retransmission.

6. The method of claim 1, further comprising:
receiving information related to SL HARQ feedback, and
wherein the information related to SL HARQ feedback includes at least one of the maximum number of retransmission, a default number of retransmission, or HARQ round trip time (RTT).

7. The method of claim 6,
wherein the maximum number of retransmission is a number of retransmissions of the data allowed to the first apparatus, and
wherein the default number of HARQ retransmission is a number of retransmissions of the data required to the first apparatus.

8. The method of claim 7,
wherein the resource selection window is adjusted based on a time duration of the resource selection window, the maximum number of HARQ retransmission and an HARQ RTT applying a maximum delayable time value.

9. The method of claim 7,
wherein the resource selection window is adjusted based on the information related to the SL HARQ feedback and information related to capability of the first apparatus.

10. The method of claim 7,
wherein the resource selection window is adjusted based on the information related to the SL HARQ feedback and reliability information related to the data.

11. The method of claim 7,
wherein the resource selection window is adjusted based on the information related to the SL HARQ feedback and priority information related to the data.

12. The method of claim 7,
wherein the resource selection window is adjusted based on the information related to the SL HARQ feedback and channel information related to the data.

13. A first apparatus in a wireless communication system, comprising:
one or more processors; one or more transceivers; and
one or more memories connected to the one or more processors and storing instructions that, based on being executed, cause the first apparatus to perform operations comprising:
determining a resource selection window for selecting a resource related to sidelink (SL) transmission,
wherein an end of the resource selection window is determined based on a delay budget of a packet;
based on SL hybrid automatic repeat request (HARQ) feedback being configured, selecting a first SL resource and a second SL resource from a subset of resources related to the SL transmission, (i) ensuring a minimum time gap between two resources and (ii) within the resource selection window of which the end is determined based on the delay budget of a packet,
wherein the minimum time gap is a time gap required (i) from a time the first apparatus transmits data to a second apparatus (ii) to a time the first apparatus retransmits data to the second apparatus based on a reception of the SL HARQ feedback; and
transmitting, to the second apparatus, data in which the SL HARQ feedback is enabled, based on the first SL resource.

14. The first apparatus of claim 13,
wherein the resource selection window includes at least one of a first resource selection window or a second resource selection window,
wherein the first SL resource is selected based on the minimum time gap in at least one of the first resource selection window or the second resource selection window, and
wherein the second SL resource is selected based on the minimum time gap in at least one of the second resource selection window or the first resource selection window.

15. The first apparatus of claim 13, wherein the operations further comprise:
receiving an SL HARQ NACK for the data from the second apparatus; and
retransmitting the data to the second apparatus based on the second SL resource.

16. The first apparatus of claim 13, wherein the operations further comprise:
sensing the resource related to the SL transmission, and
wherein the first SL resource and the second SL resource are selected from remaining resources except resources excluded by the sensing, (i) ensuring the minimum time gap between two resources and (ii) within the resource selection window of which the size is determined based on the delay budget of a packet.

17. The first apparatus of claim 13, wherein the operations further comprise:
receiving information related to SL HARQ feedback, and
a maximum number of retransmission related to the resource is configured.

18. The first apparatus of claim 17,
wherein the information related to SL HARQ feedback includes at least one of the maximum number of retransmission, a default number of retransmission, or HARQ round trip time (RTT).

19. A processing device adapted to control a first user equipment (UE), the processing device comprising:
one or more processors; and
one or more memories operably connectable to the one or more processors and storing instructions that, based on the instructions being executed, cause the first UE to perform operations comprising:
determining a resource selection window for selecting a resource related to sidelink (SL) transmission,
wherein an end of the resource selection window is determined based on a delay budget of a packet;
based on SL hybrid automatic repeat request (HARQ) feedback being configured, selecting a first SL resource and a second SL resource from a subset of resources related to the SL transmission, (i) ensuring a minimum time gap between two resources and (ii) within the resource selection window of which the end is determined based on the delay budget of a packet,
wherein the minimum time gap is a time gap required (i) from a time the first UE transmits data to a second UE (ii) to a time the first UE retransmits data to the second UE based on a reception of the SL HARQ feedback; and transmitting, to the second UE, data in which the SL HARQ feedback is enabled, based on the first SL resource.

20. The processing device of claim 19, wherein the operations further comprise:

sensing the resource related to the SL transmission, and wherein the first SL resource and the second SL resource are selected from remaining resources except resources excluded by the sensing, (i) ensuring the minimum time gap between two resources and (ii) within the resource selection window of which the size is determined based on the delay budget of a packet.

* * * * *